US011144095B2

(12) United States Patent
La et al.

(10) Patent No.: US 11,144,095 B2
(45) Date of Patent: Oct. 12, 2021

(54) FOLDABLE DEVICE AND METHOD OF CONTROLLING THE SAME

(71) Applicant: SAMSUNG ELECTRONICS CO., LTD., Suwon-si (KR)

(72) Inventors: Jin La, Suwon-si (KR); Yu-dong Bae, Suwon-si (KR); Yong-ho Kim, Seoul (KR); Jong-hyun Ryu, Suwon-si (KR); Yong-gook Park, Yongin-si (KR); Ae-young Lim, Yongin-si (KR); Kyung-ho Jeong, Seoul (KR); Youn-ho Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/825,587

(22) Filed: Mar. 20, 2020

(65) Prior Publication Data
US 2020/0218313 A1    Jul. 9, 2020

Related U.S. Application Data

(63) Continuation of application No. 15/864,354, filed on Jan. 8, 2018, now Pat. No. 10,635,136, which is a (Continued)

(30) Foreign Application Priority Data
Mar. 6, 2015    (KR) ................ 10-2015-0031966

(51) Int. Cl.
G06F 1/16    (2006.01)
G06F 21/31    (2013.01)
(Continued)

(52) U.S. Cl.
CPC .......... *G06F 1/1652* (2013.01); *G06F 1/1677* (2013.01); *G06F 3/017* (2013.01);
(Continued)

(58) Field of Classification Search
None
See application file for complete search history.

(56) References Cited

U.S. PATENT DOCUMENTS 3,729,243 A    4/1973    Musgrave et al.
4,270,819 A    6/1981    Ooho
(Continued)

FOREIGN PATENT DOCUMENTS

AU    2012215303 B2    8/2012
CN    101146372 A    3/2008
(Continued)

OTHER PUBLICATIONS

Office Action dated Aug. 11, 2020, issued by the United States Patent and Trademark Office in U.S. Appl. No. 16/600,109.
(Continued)

*Primary Examiner* — Edward Martello
(74) *Attorney, Agent, or Firm* — Sughrue Mion, PLLC

(57) ABSTRACT

A foldable device and a method of controlling the same are provided. The foldable device includes: a flexible display which includes a main display area and an edge display area; and a controller which is configured to determine, based on an angle at which the foldable device is unfolded, a range of a partial activation area of the main display area, wherein the range of the partial activation area is partially bounded by a boundary between the edge display area and the main display area.

15 Claims, 25 Drawing Sheets

Related U.S. Application Data continuation of application No. 14/953,670, filed on Nov. 30, 2015, now Pat. No. 9,864,410.

(60) Provisional application No. 62/097,223, filed on Dec. 29, 2014.

(51) Int. Cl.

| | | |
|---|---|---|
| H04M 1/02 | (2006.01) | |
| G06F 3/0487 | (2013.01) | |
| G06F 3/01 | (2006.01) | |
| H04M 1/72403 | (2021.01) | |
| H04L 29/06 | (2006.01) | |
| H04W 88/02 | (2009.01) | |
| H04W 12/06 | (2021.01) | |

(52) U.S. Cl.
CPC .......... *G06F 3/0487* (2013.01); *G06F 21/31* (2013.01); *H04M 1/0243* (2013.01); *H04M 1/72403* (2021.01); *G06F 2203/04803* (2013.01); *H04L 63/083* (2013.01); *H04M 1/0214* (2013.01); *H04M 1/0268* (2013.01); *H04M 2250/22* (2013.01); *H04W 12/06* (2013.01); *H04W 88/02* (2013.01)

(56) References Cited

U.S. PATENT DOCUMENTS

| | | | |
|---|---|---|---|
| 4,979,554 | A | 12/1990 | Nelson |
| 5,520,361 | A | 5/1996 | Lee |
| 5,790,679 | A | 8/1998 | Hawker et al. |
| 6,944,481 | B2 | 9/2005 | Hama et al. |
| 6,963,647 | B1 | 11/2005 | Krueger et al. |
| 7,092,745 | B1 | 8/2006 | D'Souza |
| 7,120,264 | B2 | 10/2006 | Saiki et al. |
| D540,354 | S | 4/2007 | Rousselin |
| 7,233,678 | B2 | 6/2007 | Erixon et al. |
| 7,746,627 | B2 | 6/2010 | Yamaguchi et al. |
| 8,098,868 | B2 | 1/2012 | Kim et al. |
| 8,483,422 | B2 | 7/2013 | Welker et al. |
| 8,514,196 | B2 | 8/2013 | Kim |
| 8,543,166 | B2 | 9/2013 | Choi et al. |
| 8,817,189 | B2 | 8/2014 | Freund et al. |
| 8,842,090 | B1 | 9/2014 | Cho et al. |
| 8,958,026 | B2 | 2/2015 | Park et al. |
| 9,013,368 | B1* | 4/2015 | Kim ............... G06F 3/1446 345/1.3 |
| 9,076,364 | B2 | 7/2015 | Hung et al. |
| 9,103,490 | B2 | 8/2015 | Atallah et al. |
| 9,116,662 | B1 | 8/2015 | Song et al. |
| 9,134,846 | B2 | 9/2015 | Lee et al. |
| 9,170,678 | B2* | 10/2015 | Cho ............... G06F 3/04886 |
| 9,189,101 | B2 | 11/2015 | Park et al. |
| 9,261,995 | B2 | 2/2016 | Kimm |
| 9,299,314 | B2 | 3/2016 | Lee et al. |
| 9,307,658 | B2 | 4/2016 | Song et al. |
| 9,348,362 | B2 | 5/2016 | Ko et al. |
| 9,466,265 | B2 | 10/2016 | Cho et al. |
| 9,537,527 | B2 | 1/2017 | Huh et al. |
| 9,684,342 | B2 | 6/2017 | Kim et al. |
| 9,778,766 | B2 | 10/2017 | Choi et al. |
| 9,843,658 | B2 | 12/2017 | Huh et al. |
| 9,864,567 | B2 | 1/2018 | Seo |
| 9,894,430 | B2 | 2/2018 | Hosoi et al. |
| 10,348,875 | B2 | 7/2019 | Lynch |
| 10,447,830 | B2 | 10/2019 | Huh et al. |
| 10,521,034 | B2 | 12/2019 | Myers et al. |
| 2007/0052851 | A1 | 3/2007 | Ochs et al. |
| 2008/0178501 | A1 | 7/2008 | Crowell et al. |
| 2008/0186415 | A1 | 8/2008 | Boud et al. |
| 2008/0212271 | A1 | 9/2008 | Misawa |
| 2009/0091578 | A1 | 4/2009 | Carnahan et al. |
| 2009/0233265 | A1 | 9/2009 | Budryk et al. |
| 2009/0280860 | A1 | 11/2009 | Dahlke |
| 2010/0048252 | A1 | 2/2010 | Kang et al. |
| 2010/0060548 | A1 | 3/2010 | Choi et al. |
| 2010/0117975 | A1 | 5/2010 | Cho |
| 2010/0182265 | A1 | 7/2010 | Kim et al. |
| 2010/0188422 | A1 | 7/2010 | Shingai et al. |
| 2010/0247061 | A1 | 9/2010 | Bennett et al. |
| 2010/0302445 | A1 | 12/2010 | Kunihara |
| 2010/0328223 | A1 | 12/2010 | Mockarram-Dorri et al. |
| 2011/0002112 | A1 | 1/2011 | Hsu et al. |
| 2011/0065479 | A1 | 3/2011 | Nadar |
| 2011/0134144 | A1 | 6/2011 | Moriwaki |
| 2011/0148930 | A1 | 6/2011 | Lee et al. |
| 2012/0075166 | A1 | 3/2012 | Marti et al. |
| 2012/0235894 | A1 | 9/2012 | Phillips |
| 2013/0111384 | A1 | 5/2013 | Kim et al. |
| 2013/0114193 | A1 | 5/2013 | Joo et al. |
| 2013/0127912 | A1 | 5/2013 | Lin |
| 2013/0127918 | A1 | 5/2013 | Kang et al. |
| 2013/0155655 | A1 | 6/2013 | Lee et al. |
| 2013/0169545 | A1 | 7/2013 | Eaton et al. |
| 2013/0176232 | A1 | 7/2013 | Waeller |
| 2013/0178248 | A1 | 7/2013 | Kim |
| 2013/0215011 | A1 | 8/2013 | Ke |
| 2013/0222271 | A1 | 8/2013 | Alberth et al. |
| 2013/0278873 | A1 | 10/2013 | Enomoto |
| 2013/0300682 | A1 | 11/2013 | Choi et al. |
| 2013/0300697 | A1 | 11/2013 | Kim et al. |
| 2013/0314341 | A1 | 11/2013 | Lee et al. |
| 2013/0321264 | A1 | 12/2013 | Park et al. |
| 2013/0321434 | A1 | 12/2013 | Ko et al. |
| 2014/0015743 | A1 | 1/2014 | Seo et al. |
| 2014/0049463 | A1 | 2/2014 | Seo et al. |
| 2014/0055429 | A1 | 2/2014 | Kwon et al. |
| 2014/0079231 | A1 | 3/2014 | Yu et al. |
| 2014/0079269 | A1 | 3/2014 | Choi |
| 2014/0092356 | A1 | 4/2014 | Ahn et al. |
| 2014/0099479 | A1 | 4/2014 | Krall et al. |
| 2014/0118258 | A1 | 5/2014 | Park et al. |
| 2014/0118271 | A1 | 5/2014 | Lee et al. |
| 2014/0118317 | A1 | 5/2014 | Song et al. |
| 2014/0132481 | A1 | 5/2014 | Bell et al. |
| 2014/0152553 | A1 | 6/2014 | Cha et al. |
| 2014/0191956 | A1 | 7/2014 | Suo |
| 2014/0210706 | A1 | 7/2014 | Park et al. |
| 2014/0218321 | A1 | 8/2014 | Lee et al. |
| 2014/0226266 | A1 | 8/2014 | Kang et al. |
| 2014/0226275 | A1 | 8/2014 | Ko et al. |
| 2014/0240289 | A1 | 8/2014 | Myers et al. |
| 2014/0247229 | A1 | 9/2014 | Cho et al. |
| 2014/0247252 | A1 | 9/2014 | Lee |
| 2014/0267091 | A1 | 9/2014 | Kim |
| 2014/0267097 | A1 | 9/2014 | Lee et al. |
| 2014/0268623 | A1 | 9/2014 | Kim et al. |
| 2014/0285433 | A1 | 9/2014 | Park et al. |
| 2014/0285450 | A1 | 9/2014 | Cho et al. |
| 2014/0306908 | A1 | 10/2014 | Nagaraju |
| 2014/0354791 | A1 | 12/2014 | Lee et al. |
| 2014/0375219 | A1 | 12/2014 | Lee et al. |
| 2015/0029166 | A1 | 1/2015 | Park et al. |
| 2015/0035812 | A1 | 2/2015 | Shin et al. |
| 2015/0049090 | A1 | 2/2015 | Kim et al. |
| 2015/0130775 | A1 | 5/2015 | Kim et al. |
| 2015/0131836 | A1 | 5/2015 | Hoshikawa |
| 2015/0187325 | A1 | 7/2015 | Yeo et al. |
| 2015/0242006 | A1 | 8/2015 | Kim et al. |
| 2015/0301738 | A1 | 10/2015 | Nishigaki |
| 2015/0317949 | A1 | 11/2015 | Cho |
| 2015/0370423 | A1 | 12/2015 | Liu |
| 2016/0006862 | A1 | 1/2016 | Park et al. |
| 2016/0041680 | A1 | 2/2016 | Chi et al. |
| 2016/0054796 | A1 | 2/2016 | Cho |
| 2016/0055006 | A1 | 2/2016 | Woo et al. |
| 2016/0111028 | A1 | 4/2016 | Lee et al. |
| 2016/0373565 | A1 | 12/2016 | Kim |
| 2019/0191022 | A1 | 6/2019 | Kim |

(56) References Cited

U.S. PATENT DOCUMENTS

FOREIGN PATENT DOCUMENTS

| | | | |
|---|---|---|---|
| CN | 101183292 A | 5/2008 |
| CN | 201248078 Y | 5/2009 |
| CN | 101656788 A | 2/2010 |
| CN | 101788850 A | 7/2010 |
| CN | 102473023 A | 5/2012 |
| CN | 102959930 A | 3/2013 |
| CN | 103389866 A | 11/2013 |
| CN | 103416043 A | 11/2013 |
| CN | 103744586 A | 4/2014 |
| CN | 103793167 A | 5/2014 |
| CN | 103828334 A | 5/2014 |
| CN | 103853521 A | 6/2014 |
| CN | 103946780 A | 7/2014 |
| CN | 203691467 U | 7/2014 |
| CN | 104077061 A | 10/2014 |
| CN | 104115095 A | 10/2014 |
| CN | 104160632 A | 11/2014 |
| CN | 104205871 A | 12/2014 |
| CN | 104238807 A | 12/2014 |
| EP | 2 669 771 A1 | 12/2013 |
| EP | 2701049 A2 | 2/2014 |
| EP | 2 711 821 A1 | 3/2014 |
| EP | 2 725 474 A2 | 4/2014 |
| EP | 2 728 437 A2 | 5/2014 |
| EP | 2 947 538 A2 | 11/2015 |
| EP | 2 977 850 A1 | 1/2016 |
| JP | 2014-099764 A | 5/2014 |
| KR | 10-2008-0025558 A | 3/2008 |
| KR | 10-2010-0027501 A | 3/2010 |
| KR | 10-2011-0112943 A | 10/2011 |
| KR | 10-2013-0081617 A | 7/2013 |
| KR | 10-2013-0127050 A | 11/2013 |
| KR | 10-2014-0040975 A | 4/2014 |
| KR | 10-2014-0054746 A | 5/2014 |
| KR | 10-2014-0086712 A | 7/2014 |
| KR | 10-2014-0101274 A | 8/2014 |
| KR | 10-2014-0113178 A | 9/2014 |
| KR | 10-2014-0120470 A | 10/2014 |
| WO | 2013/118941 A1 | 8/2013 |
| WO | 2014175513 A1 | 10/2014 |

OTHER PUBLICATIONS

Communication dated Aug. 19, 2020, issued by the China National Intellectual Property Administration in Chinese Application No. 201580071720.X.
Communication dated Jul. 10, 2018, issued by the European Patent Office in counterpart European Application No. 15196816.1.
Communication dated Oct. 18, 2018 issued by the United States Patent Office in Counterpart U.S. Appl. No. 15/207,206.
Communication dated Jan. 28, 2020, issued by the Korean Intellectual Property Office in counterpart Korean Application No. 10-2015-0050718.
Communication dated Dec. 11, 2018, issued by the USPTO in counterpart U.S. Appl. No. 15/822,535.
Communication dated Jul. 9, 2018, issued by the European Patent Office in counterpart European Application No. 16182538.5.
Communication dated Sep. 6, 2018 issued by the United States Patent Office in Counterpart U.S. Appl. No. 15/822,535.
Communication dated Dec. 4, 2019, issued by the Indian Patent Office in counterpart Indian Application No. 3640/DEL/2015.
Communication dated Dec. 28, 2018, from the State Intellectual Property Office of People's Republic of China in counterpart Application No. 201510906432.3.
Communication dated Jul. 3, 2018, issued by the State Intellectual Property Office of P.R. China in counterpart Chinese Application No. 201510906432.3.
Communication dated Nov. 26, 2019 issued by the European Patent Office in counterpart European Application No. 19195701.8.
Communication dated Aug. 3, 2016, issued by the United States Patent and Trademark Office in counterpart U.S. Appl. No. 14/745,926.
Communication dated Jul. 19, 2016, issued by the United States Patent and Trademark Office in counterpart U.S. Appl. No. 14/837,185.
Communication dated Mar. 28, 2017, issued by the European Patent Office in counterpart European Application No. 15196816.1.
Communication dated Nov. 3, 2017, issued by the United States Patent and Trademark Office in counterpart U.S. Appl. No. 14/837,185.
Communication dated Oct. 31, 2016, issued by the European Patent Office in counterpart European Application No. 16182538.5.
International Search report dated May 24, 2016 in the International Applcaition No. PCT/KR2015/014342.
Notice of Allowance dated Aug. 24, 2016 by the United States Patent and Trademark Office in related U.S. Appl. No. 14/826,317.
Written Opinion dated Mar. 14, 2016, issued by the International Searching Authority in counterpart International Patent Application No. PCT/KR2015/012891 (PCT/ISA/237).
Communication dated Apr. 29, 2016 issued by the European Patent Office in counterpart European Patent Application No. 15196816.1.
Communication dated May 21, 2019, issued by the Chinese Patent Office in counterpart Chinese Application No. 201610585781.4.
Communication dated Jan. 12, 2017, issued by the United States Patent and Trademark Office in counterpart U.S. Appl. No. 15/373,843.
Communication dated Mar. 14, 2016 issued by the International Searching Authority in counterpart International Patent Application No. PCT/KR2015012891 (PCT/ISA/210, PCT/ISA/237).
Communication dated May 24, 2016 issued by the International Searching Authority in counterpart International Application No. PCT/KR2015/014342 (PCT/ISA/210 & PCT/ISA/237).
Communication dated Oct. 27, 2016, issued by the United States Patent and Trademark Office in counterpart U.S. Appl. No. 14/837,185.
International Search Report, issued by International Searching Authority in corresponding International Application No. PCT/KR2015/014346, dated Apr. 15, 2016. (PCT/ISA/210).
Written Opinion, issued by International Searching Authority in corresponding International Application No. PCT/KR2015/014346, dated Apr. 15, 2016. (PCT/ISA/237).
Communication dated May 30, 2019, issued by the Chinese Patent Office in counterpart Chinese Application No. 201580071720.X.
Communication dated Jul. 3, 2018, issued by the State Intellectual Property Office of P.R. China in counterpart Chinese Application No. 201610585781.4.
Communication dated Nov. 21, 2019 issued by the State Intellectual Property Office of P.R. China in counterpart Chinese Application No. 201580070270.2.
Communication dated Nov. 26, 2019 issued by the European Patent Office in counterpart European Application No. 16 182 538.5.
Communication dated Feb. 28, 2017, issued by the United States Patent and Trademark Office in counterpart U.S. Appl. No. 14/837,185.
International Search Report, issued by International Searching Authority in corresponding International Application No. PCT/KR2015/014342, dated May 24, 2016. (PCT/ISA/210).
Communication issued by the European Patent Office dated Aug. 18, 2017 in counterpart European Application No. 15875533.0.
Office Action dated Jun. 20, 2017 by the United States Patent and Trademark Office in U.S. Appl. No. 14/837,185.
Communication dated Feb. 12, 2018 issued by the United States Patent and Trademark Office in counterpart U.S. Appl. No. 15/822,535.
Communication dated Oct. 27, 2020, issued by the State Intellectual Property Office of P.R. China in counterpart Chinese Application No. 201580070270.2.
Communication dated Dec. 22, 2020, issued by the Korean Intellectual Property Office in counterpart Korean Patent Application No. 10-2015-0035825.
Communication dated Oct. 9, 2020 issued by the European Intellectual Property Office in European Application No. 16 182 538.5.
Communication dated Oct. 9, 2020 issued by the European Intellectual Property Office in European Application No. 19 195 701.8.
Communication dated May 31, 2021 by the Korean Intellectual Property Office in Korean Patent Application No. 10-2015-0050731.
Office Action dated Jul. 9, 2021 by the United States Patent and Trademark Office in U.S. Appl. No. 16/940,028.

(56) References Cited

OTHER PUBLICATIONS

Communication dated Aug. 4, 2021 by the Intellectual Property Office of India in Indian Patent Application No. 201915025922.
Communication dated Aug. 5, 2021 by the Intellectual Property Office of India in Indian Patent Application No. 202015009094.
Communication dated Sep. 6, 2021, issued by the European Patent Office in European Application No. 21174793.6.

* cited by examiner

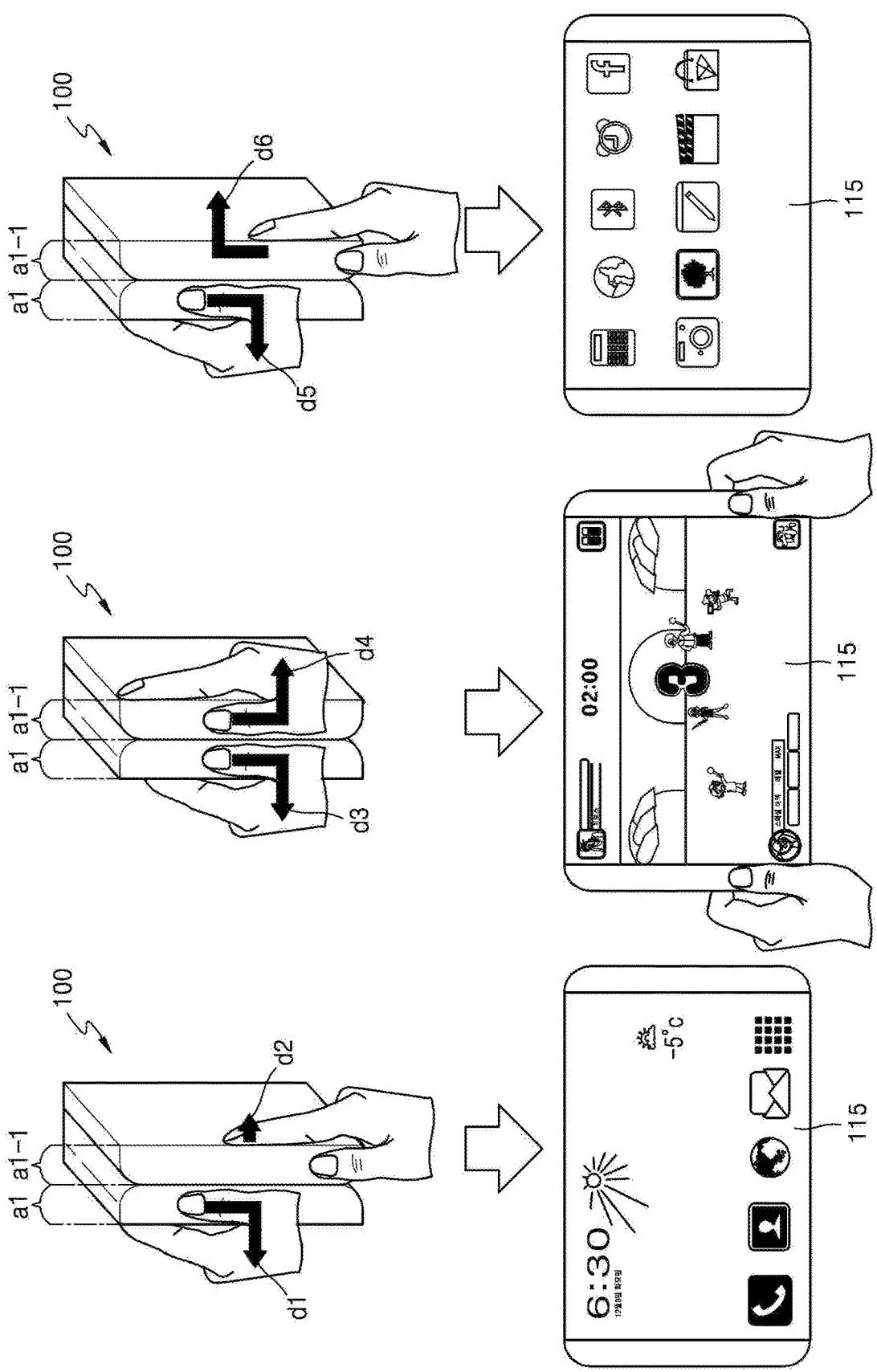

FOLDABLE DEVICE AND METHOD OF CONTROLLING THE SAME

CROSS-REFERENCE TO RELATED APPLICATIONS

This is a continuation of U.S. application Ser. No. 15/864,354, filed Jan. 8, 2018, which is a continuation of U.S. application Ser. No. 14/953,670 filed Nov. 30, 2015 (now U.S. Pat. No. 9,864,410), which claims the benefit of U.S. Provisional Application No. 62/097,223, filed on Dec. 29, 2014, in the U.S. Patent and Trademark Office, and priority from Korean Patent Application No. 10-2015-0031966, filed on Mar. 6, 2015, in the Korean Intellectual Property Office, the disclosures of which are incorporated herein by reference in their respective entireties.

BACKGROUND

1. Field

Apparatuses and methods consistent with exemplary embodiments relate to a foldable device and a method of controlling the same, and more particularly, to a foldable device that includes a flexible display unit and controls an activation of the flexible display unit when the foldable device is unfolded, and a method of controlling the foldable device.

2. Description of the Related Art

As developments in display technology advance, various display apparatuses, such as flexible displays or transparent displays, are being developed. Since a user may fold or unfold a device that includes a flexible display based on a circumstance of using the device, a volume of the device may be significantly reduced.

A flexible display may be implemented in the form of an organic light-emitting display (OLED), a liquid-crystal display (LCD), or the like. For example, a flexible display may be manufactured by using a flexible material for the LCD or the organic light-emitting display, for example, by substituting an organic substrate with a plastic film. Additionally, a foldable device may be manufactured by using a flexible material for at least a part, which may be folded, in the LCD or the organic light-emitting display.

As a flexible display is used, various fields to which the flexible display may be applicable are emerging. For example, a flexible display may be applied to a field of electronic books that may substitute for publications such as magazines, textbooks, books, or cartoons, or a field of new portable information technology (IT) products, such as a subminiature personal computer (PC) that may be carried by folding or rolling a display or a smart card for checking information in real time. Thus, there is a demand for development of an interface in which characteristics of a flexible display which are reflective of the flexible display are employed.

SUMMARY

Exemplary embodiments provide a foldable device that includes a flexible display unit that is configured to control an activation of the flexible display unit as the foldable device is unfolded, and a method of controlling the foldable device.

Additional aspects will be set forth in part in the description which follows and, in part, will be apparent from the description, or may be learned by practice of the presented exemplary embodiments.

According to an aspect of an exemplary embodiment, a foldable device includes: a flexible display which includes a main display area and an edge display area; and a controller configured to determine a range of a partial activation area of the main display area, which is partially bounded by a boundary between the edge display area and the main display area, based on an angle at which the foldable device is unfolded.

The controller may be further configured to activate the edge display area in response to the angle at which the foldable device is unfolded being greater than or equal to a predetermined first angle with respect to a state of being folded, and to activate a portion of the main display area in response to the angle at which the foldable device is unfolded being greater than or equal to a predetermined second angle, and to expand the range of the partial activation area of the main display area, in response to the angle at which the foldable device is unfolded being increased.

The controller may be further configured to display a first content on the edge display area and to display detailed content, which is related to the first content displayed on the edge display area, on the activated portion of the main display area.

The controller may be further configured to adjust at least one from among a type, an amount, and an attribute of content that is to be displayed on the activated portion of the main display area, based on the range of the partial activation area of the main display area.

The controller may be further configured to activate an entirety of the main display area in response to the angle at which the foldable device is unfolded being greater than or equal to a predetermined third angle.

The flexible display may further include a plurality of edge display areas, and the controller may be further configured to determine a location from which an activated portion of the main display area starts, based on a direction in which a user views the foldable device.

The flexible display may further include a plurality of edge display areas, and the controller may be further configured to determine at least one edge display area that is to be activated, from among the plurality of edge display areas, based on an angle at which the foldable device is inclined while in a state of being folded and a direction in which a user views the foldable device.

The controller may be further configured to activate the edge display area if at least one from among a plurality of events including a message reception, a call reception, and an alarm is generated.

The edge display area may include a display area that is exposed to an outside while the foldable device is folded.

According to an aspect of an exemplary embodiment, a method for controlling a foldable device that includes a flexible display including a main display area and an edge display area, the method including: sensing an angle at which the foldable device is unfolded; and determining a range of a partial activation area of the main display area, which is partially bounded by a boundary between the edge display area and the main display area, based on the sensed angle at which the foldable device is unfolded.

The method may further include: activating the edge display area in response to the sensed angle at which the foldable device is unfolded being greater than or equal to a predetermined first angle with respect to a state of being folded; activating a portion of the main display area in response to the sensed angle at which the foldable device is unfolded being greater than or equal to a predetermined second angle; and expanding the range of the partial activation area of the main display area, in response to the sensed angle at which the foldable device is unfolded being increased.

The method may further include: displaying first content on the edge display area; and displaying detailed content, which is related to the first content displayed on the edge display area, on the activated portion of the main display area.

The determining the range of the partial activation area of the main display area may include adjusting at least one from among a type, an amount, and an attribute of content that is to be displayed on the partial activation area, based on the range of the partial activation area.

The method may further include activating an entirety of the main display area in response to the sensed angle at which the foldable device is unfolded being greater than or equal to a predetermined third angle.

The flexible display may further include a plurality of edge display areas, and the determining the range of the partial activation area of the main display area may include a plurality of edge display areas, determining a location from which an activated portion of the main display area starts, according to a direction in which a user views the foldable device.

The flexible display may further include a plurality of edge display areas, and the method may further include determining at least one edge display area that is to be activated, from among the plurality of edge display areas, based on an angle at which the foldable device is inclined while in a state of being folded and a direction in which a user views the foldable device.

The method may further include activating the edge display area in response to at least one of a message reception, a call reception, and an alarm being generated.

The edge display area may include a display area that is exposed to an outside while the foldable device is folded.

BRIEF DESCRIPTION OF THE DRAWINGS

These and/or other aspects will become apparent and more readily appreciated from the following description of the exemplary embodiments, taken in conjunction with the accompanying drawings in which:

FIGS. 22A, 22B, and 23 illustrate diagrams for explaining an example of performing displaying on the display unit based on a gesture of unfolding the foldable device.

DETAILED DESCRIPTION

Figure 1A:
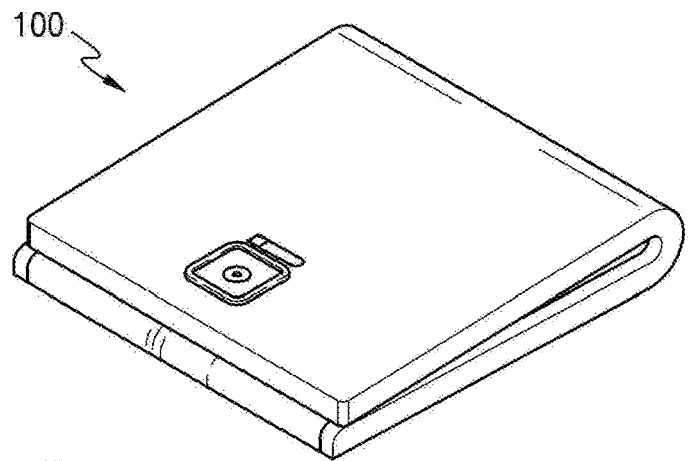
FIGS. 1A, 1B, and 1C illustrate schematic diagrams of a foldable device, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

The present inventive concept will now be described more fully with reference to the accompanying drawings, in which exemplary embodiments of the present inventive concept are shown. The present inventive concept may, however, be embodied in many different forms and should not be construed as being limited to the exemplary embodiments set forth herein. In the description of the present inventive concept, certain detailed explanations of the related art are omitted when it is deemed that they may unnecessarily obscure the essence of the present inventive concept. Like numbers refer to like elements throughout the description of the figures.

A purpose, advantages, and features of the present inventive concept will become apparent from the following detailed description. However, as the present inventive concept allows for various changes and numerous embodiments, exemplary embodiments will be illustrated in the drawings and described in detail in the written description.

Like reference numerals in the drawings denote like elements. In the description of the present inventive concept, certain detailed explanations of well-known functions or configurations are omitted when it is deemed that they may unnecessarily obscure the essence of the present inventive concept. Additionally, it will be understood that, although the terms, 'first', 'second', etc. may be used herein to describe various elements, these elements should not be limited by these terms. These terms are only used to distinguish one element from another.

Hereinafter, a foldable device according to one or more exemplary embodiments will be described in detail with reference to the attached drawings. Terms such as " . . . unit" and " . . . module," are used in the following description in consideration of only ease of drafting of the specification, and thus do not have distinct meanings or roles in themselves.

A foldable device 100 may include any of a smartphone, a tablet personal computer (PC), a laptop computer, an electronic book, a wearable device, a digital broadcasting terminal, a personal digital assistance (PDA), a portable multimedia player (PMP), a navigation system, or the like. However, according to exemplary embodiments, it will be understood by one of ordinary skill in the art that a configuration of the foldable device 100 may be also applied to a fixed terminal, such as a digital TV, a desktop computer, or the like except when the configuration may be only applied to a mobile terminal.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

Hereinafter, exemplary embodiments will be described in detail with reference to the attached drawings.

Figure 1B:
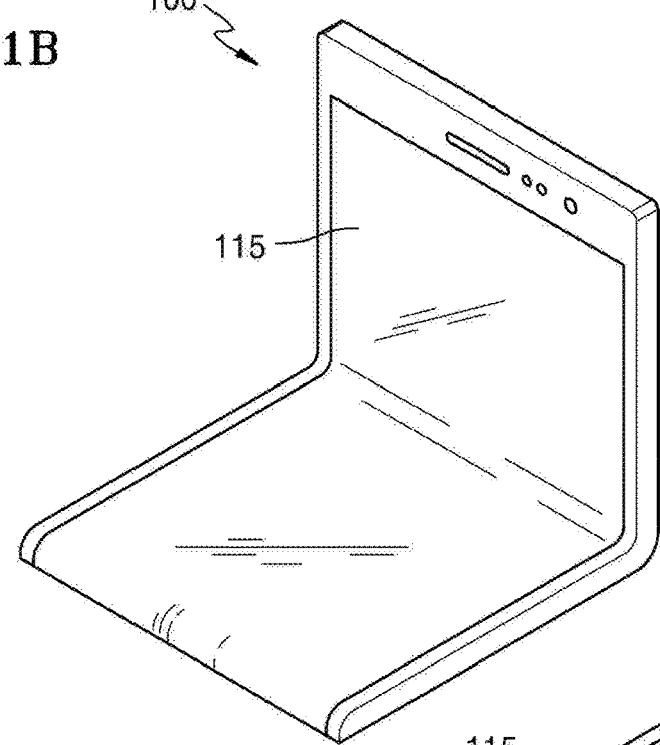
Figure 1C:
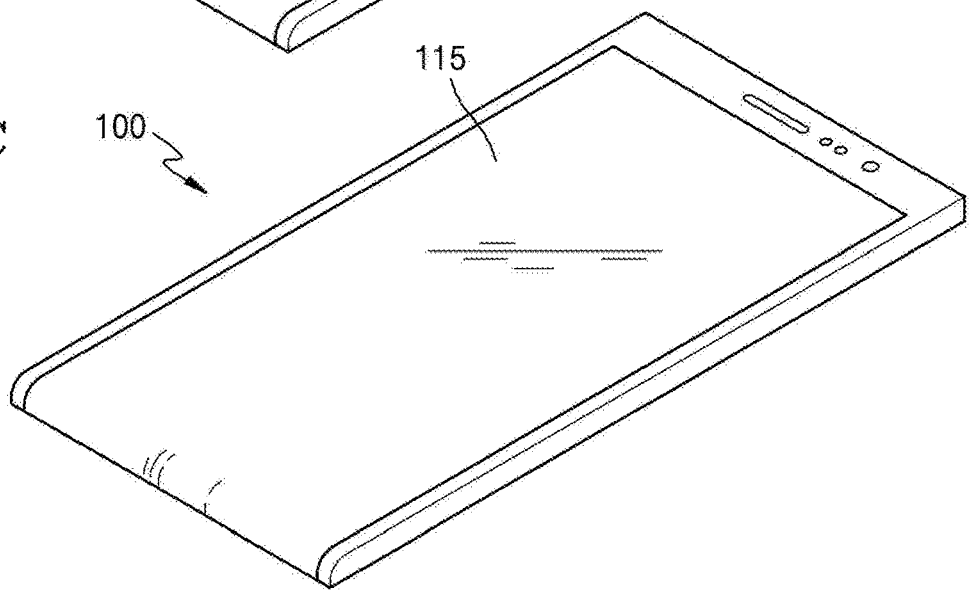

FIGS. 1A, 1B, and 1C illustrate schematic diagrams of the foldable device 100, according to an exemplary embodiment.

The foldable device 100, described herein, may include a flexible display unit (also referred to herein as a "flexible display device" and/or a "flexible display") 115.

The foldable device 100, which includes the flexible display unit 115, may be folded when the foldable device 100 is bent with reference to an arbitrary line that may be drawn on the flexible display unit 115, and thus, both surfaces that are obtained when the flexible display unit 115 is bent and face each other, approach to within a close proximity of each other, and are almost in parallel with each other.

FIGS. 1A, 1B, and 1C illustrate examples of the foldable device 100 according to an exemplary embodiment. FIG. 1A shows an example of a state when the foldable device 100 is folded. FIG. 1B shows an example of a state when the foldable device 100 is unfolded at a certain angle. FIG. 1C shows an example of a state when the foldable device 100 is unfolded to a maximum.

FIGS. 1A, 1B, and 1C illustrate examples of the foldable device 100. However, the foldable device 100 is not limited thereto. For example, the foldable device 100 may be implemented in the form of a laptop computer, a tablet PC, or the like.

Figure 2:
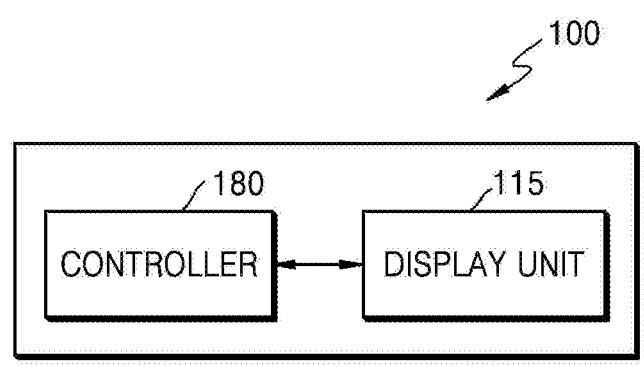
FIGS. 2 and 3 illustrate block diagrams of the foldable device, according to an exemplary embodiment.
Figure 3:
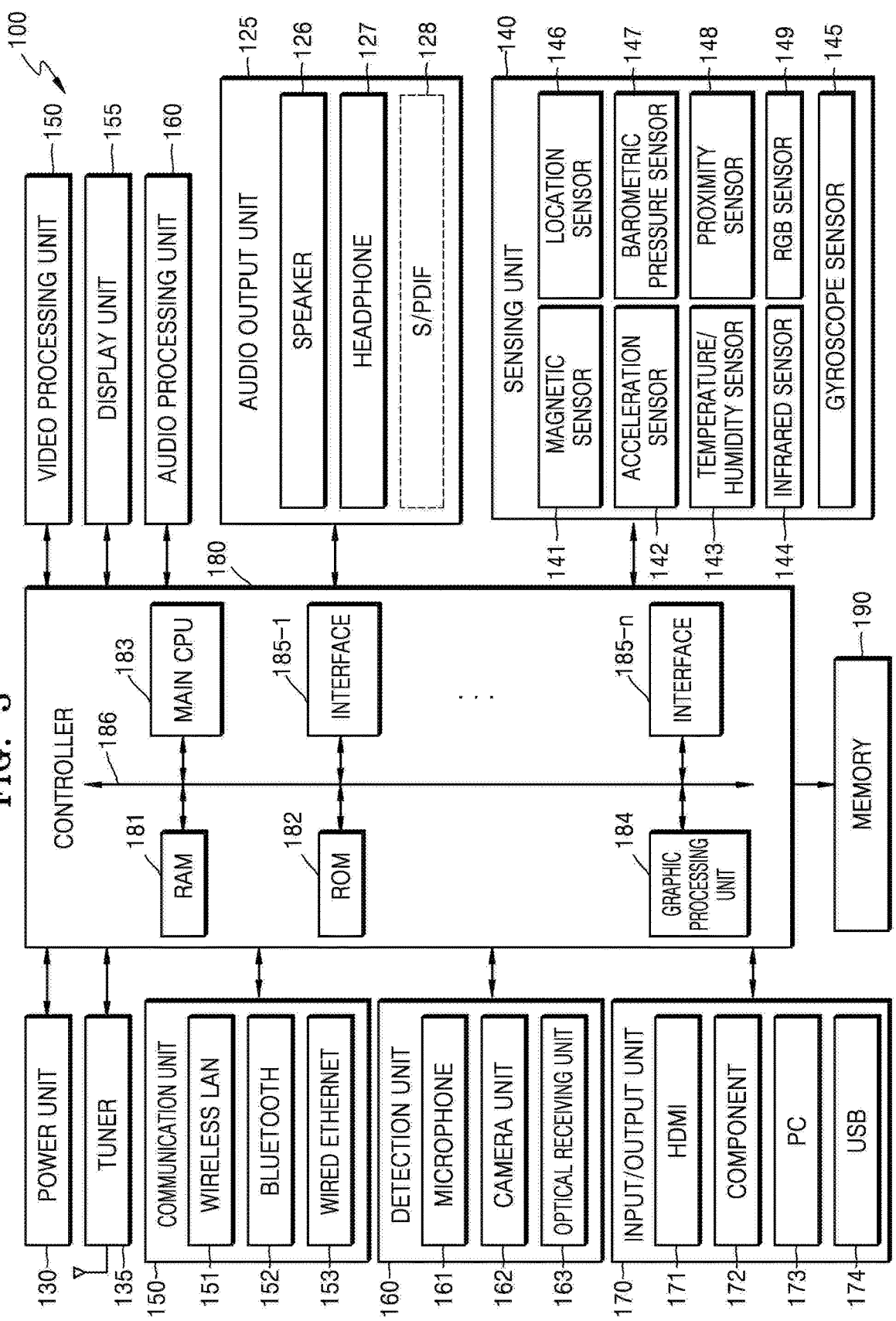

FIGS. 2 and 3 illustrate block diagrams of the foldable device 100, according to an exemplary embodiment.

Referring to FIG. 2, the foldable device 100 may include the flexible display unit 115 (also referred to herein as a "flexible display") and a controller 180. However, all elements, shown in FIG. 2, are not essential elements. The foldable device 100 may be implemented by using more or less elements than those shown in FIG. 2.

For example, according to an exemplary embodiment, as shown in FIG. 3, the foldable device 100 may further include a video processing unit (also referred to herein as a "video processor") 110, an audio processing unit (also referred to herein as an "audio processor") 120, an audio output unit (also referred to herein as an "audio output device" and/or as a "speaker") 125, a power unit (also referred to herein as a "power supplier") 130, a tuner 135, a sensing unit (also referred to herein as a "sensor") 140, a communication unit (also referred to herein as a "communicator") 150, a detection unit (also referred to herein as a "detector") 160, an input/output unit (also referred to herein as an "input/output device") 170, and a storage unit (also referred to herein as a "storage device" and/or as a "storage") 190.

Hereinafter, the elements will be described.

The video processing unit 110 processes video data received by the device 100. The video processing unit 110 may perform any of various image processing functions, such as, for example, decoding, scaling, noise filtering, frame rate conversion, resolution conversion, or the like with respect to the video data.

The flexible display unit 115 may display video data included in a broadcasting signal received via the tuner 135, according to control by the controller 180. Additionally, the flexible display unit 115 may display content (for example, moving images) input via the communication unit 150 and/or via the input/output unit 170. The flexible display unit 115 may output an image stored in the storage unit 190 according to control by the controller 180. Additionally, the flexible display unit 115 may display a voice user interface (UI) for performing a voice recognition task that corresponds to voice recognition (for example, a voice UI that includes a voice command language guide) or a motion UI for performing a motion recognition task that corresponds to motion recognition (for example, a motion UI that includes a user motion guide configured for motion recognition).

According to an exemplary embodiment, the flexible display unit 115 may consist of a main display area, a floating display area included in the main display area, and an edge display area. Each display area will be described in detail with reference to FIG. 6.

According to an exemplary embodiment, a range of the floating display area, which starts from a boundary between the edge display area and the main display area, may be determined based on an angle at which the foldable device 100 is unfolded, according to control by the controller 180.

Additionally, according to an exemplary embodiment, if an angle at which the foldable device 100 is unfolded is greater than or equal to a predetermined first angle with respect to a state of being folded, the edge display area may be activated according to control by the controller 180.

According to an exemplary embodiment, if an angle at which the foldable device 100 is unfolded is greater than or equal to a predetermined second angle, the floating display area may be activated according to control by the controller 180.

According to an exemplary embodiment, if an angle at which the foldable device 100 is unfolded is increased, a range of the floating display area may be expanded according to control by the controller 180.

According to an exemplary embodiment, if an angle at which the foldable device 100 is unfolded is greater than or equal to a predetermined third angle or greater, the main display area that includes the floating display area may be activated according to control by the controller 180.

According to an exemplary embodiment, a surface of the edge display area may be bent at a certain angle or greater with respect to a surface of the floating display area.

The audio processing unit 120 processes audio data. The audio processing unit 120 may perform any of various processing functions, such as, for example, decoding, amplification, or noise filtering with respect to audio data. The audio processing unit 120 may include a plurality of audio processing modules which are configured for processing audio data that corresponds to a plurality of pieces of content.

The audio output unit 125 outputs audio data included in a broadcasting signal received from the tuner 135, according to control by the controller 180. The audio output unit 125 may output audio data (for example, voice or sound) input via the communication unit 150 and/or via the input/output unit 170. Additionally, the audio output unit 125 may output audio data stored in the storage unit 190 according to control by the controller 180. The audio output unit 125 may include at least one selected from the group consisting of a speaker 126, a headphone output terminal 127, and/or a Sony/Philips digital interface (S/PDIF) output terminal 128. The audio output unit 125 may also include a combination of the speaker 126, the headphone output terminal 127, and the S/PDIF output terminal 128.

The power unit 130 supplies power input from an external power source to the elements 110 through 190 included in the foldable device 100, according to control by the controller 180. Additionally, the power unit 130 may supply power which is output from one or more batteries (not shown) located inside the foldable device 100 to the elements 110 through 190 included in the foldable device 100, according to control by the controller 180.

The tuner 135 may tune and select only a frequency in a channel which is to be received by the foldable device 100, from among radio wave elements, by performing amplification, mixing, and/or resonating a broadcasting signal that is received via a wire or wirelessly. The broadcast signal includes any of audio data, video data, and/or additional information (for example, an electronic program guide (EPG)).

The tuner 135 may receive a broadcast signal in a frequency band that corresponds to a channel number (for example, a cable TV channel number 506) according to a user input (for example, an input of a control signal received from a control apparatus, such as a channel number input, a channel-up or down input, or a channel input on an EPG screen).

The tuner 135 may receive a broadcast signal from any of various sources such as a terrestrial broadcasting station, a cable broadcasting station, a satellite broadcasting station, or an internet broadcasting source. The tuner 135 may receive a broadcast signal from a source, such as an analog broadcasting station or a digital broadcasting station. The broadcast signal received via the tuner 135 is decoded (for example, audio-decoded, video-decoded, and/or additional information-decoded), and thus, separated as audio data, video data, and/or additional information. The separated audio data, video data, and/or additional information may be stored in the storage unit 190 according to control by the controller 180.

Additionally, one or more tuners 135 may be present in the device 100. The tuner 135 may be implemented as any of an all-in-one tuner, a separate device that includes a tuner that is electrically connected to the device 100 (for example, a set-top box (not shown)), or a tuner (not shown) that is connected to the input/output unit 170.

The sensing unit 140 may detect a state of the device 100 or a state within a close proximity to the device 100 and transmit information, obtained as a result of the detecting, to the controller 130. The sensing unit 140 may include at least one selected from the group consisting of a magnetic sensor 141, an acceleration sensor 142, a temperature/humidity sensor 143, an infrared sensor 144, a gyroscope sensor 145, a location (for example, a global positioning system (GPS)) sensor 146, a barometric pressure sensor 147, a proximity sensor 148, and a red-green-blue (RGB) sensor (illuminance sensor) 149, but is not limited thereto. Functions of the respective sensors may be inferred from the name of the sensors by those of ordinary skill in the art. Thus, a detailed description thereof will not be provided here.

Additionally, the sensing unit 140 may include a sensor which is configured for detecting a touch input by an input tool or a sensor which is configured for detecting a touch input by a user. In this case, the sensor configured for detecting a touch input by the user may be included in a touchscreen or a touchpad. Additionally, the sensor configured for detecting a touch input by an input tool may be located below a touchscreen or a touchpad or included in a touchscreen or a touchpad.

According to an exemplary embodiment, the sensing unit 140 may sense an angle at which the foldable device 100 is unfolded.

Additionally, according to an exemplary embodiment, the sensing unit 140 may sense a direction in which a user views the foldable device 100.

Additionally, according to an exemplary embodiment, the sensing unit 140 may sense an angle at which the foldable device 100 is inclined while in a state of being folded.

The communication unit 150 may connect the foldable device 100 to an external apparatus (for example, an audio apparatus or the like) according to control by the controller 180. The controller 180 may transmit and/or receive (transceive) content to/from the external apparatus connected via the communication unit 150, and thus, download an application from the external apparatus and/or perform web browsing.

The communication unit 150 may include at least one selected from the group consisting of a wireless local area network (LAN) 151, Bluetooth 152, and a wired Ethernet 153. The communication unit 150 may also include a combination thereof.

Additionally, the communication unit 150 may include any of a Bluetooth low energy (BLE) communication unit, a near-field communication unit, a wireless local area network (WLAN) Wi-Fi communication unit, a Zigbee communication unit, an infrared Data Association (IrDA) communication unit, a Wi-Fi Direct (WFD) communication unit, a ultra wideband (UWB) communication unit, and/or an Ant+ communication unit, but is not limited thereto.

The communication unit 150 may transceive a wireless signal with at least one selected from the group consisting of a base station, an external terminal, and a server on a mobile communication network. The wireless signal may include any of a voice call signal, a video phone call signal or various forms of data used to transceive text or multimedia messages.

Additionally, the communication unit 150 may include a broadcasting receiving unit which is configured for receiving broadcasting signals and/or broadcasting-related information from the outside via a broadcasting channel. The broadcasting channel may include, for example, a satellite channel or a terrestrial broadcast channel.

Additionally, the communication unit 150 may receive a control signal from an external control apparatus according to control by the controller 180. The control signal may be implemented as any of a Bluetooth type, a radio frequency (RF) signal type, and/or a WiFi type.

According to an exemplary embodiment, the communication unit 150 may communicate with an external audio device according to control by the controller 115. According to an exemplary embodiment, the communication unit 150 may include a BLE communication unit and/or a WLAN (WiFi) communication unit, and transceive a certain control signal with the external audio device that is located within a certain distance.

The detection unit 160 detects a voice and/or an image of a user or an interaction of the user.

A microphone 161 receives an uttered voice signal from a user. The microphone 161 may convert the received voice into an electrical signal, and output the voice to the controller 180. The voice signal of the user may include, for example, a voice signal that corresponds to a menu or a function of the foldable device 100. A distance of 4 meters or less from the microphone 161 to a location of a user is recommended as a range of voice recognition with respect to the microphone 161. The range of voice recognition with respect to the microphone 161 may vary in correspondence with a volume of the voice of the user and a surrounding environment of the user (for example, sound of a speaker or nearby noise).

The microphone 161 may be implemented as one body or a separate body with respect to the foldable device 100. The microphone 161, when implemented as a separate body with respect to the foldable device 100, may be electrically connected to the foldable device 100 via the communication unit 150 or the input/output unit 170.

It will be easily understood by those of ordinary skill in the art that the microphone 161 may not be included in the foldable device 100 according to performance or a structure of the foldable device 100.

A camera unit 162 may consist of a lens (not shown) and an image sensor (not shown). The camera unit 162 may support an optical zoom function and/or a digital zoom function by using a plurality of lenses and image processing. A range of recognition with respect to the camera unit 162 may vary in correspondence with an angle of view with a camera and a condition of a surrounding environment. If the camera unit 162 consists of a plurality of cameras, a three-dimensional (3D) still image or a 3D motion image may be received by using the plurality of cameras.

The camera unit 162 may be implemented as one body or a separate body with respect to the foldable device 100. An additional device (not shown) that includes a separate camera unit 162 may be electrically connected to the foldable device 100 via the communication unit 150 or the input/output unit 170.

According to an exemplary embodiment, the camera unit 162 may sense a direction in which a user views the foldable device 100.

It will be easily understood by those of ordinary skill in the art that the camera unit 162 may not be included in the foldable device 100 according to performance or a structure of the foldable device 100.

An optical receiving unit (also referred to herein as an "optical receiver") 163 receives an optical signal (which includes a control signal) received from an external control apparatus via an optical window (not shown) in a bezel of the flexible display unit 115 or the like. The optical receiving unit 163 may receive an optical signal that corresponds to a user input (for example, a touch, a push, a touch gesture, voice or a motion) from an external control apparatus. A control signal may be extracted from the received optical signal according to control by the controller 180.

The input/output unit 170 receives any of video data (for example, moving pictures or the like), audio data (for example, voice, music, or the like), and/or additional information (for example, an EPG) according to control by the controller 180. The input/output unit 170 may include at least one from among a high-definition multimedia interface (HDMI) port 171, a component jack 172, a PC port 173, and a universal serial bus (USB) port 174. The input/output unit 170 may also include a combination of the HDMI port 171, the component jack 172, the PC port 173, and the USB port 174.

It will be easily understood by those of ordinary skill in the art that performance or a structure of the input/output unit 170 may vary according to exemplary embodiments.

The controller 180 controls all operations of the foldable device 100 and a signal flow between the elements 110 through 190 included in the foldable device 100, and processes data. If a user input is present and/or a predetermined and stored condition is satisfied, the controller 180 may execute an operating system (OS) or any of various applications stored in the storage unit 190.

The controller 180 may include a random access memory (RAM) 181 that stores a signal or data input from outside of the foldable device 100 or is used as a storage area that corresponds to various work functions performed by the foldable device 100, a read-only memory (ROM) 182 that stores a control program for controlling the foldable device 100, and a processor 183.

The processor 183 may include a graphic processing unit (GPU) (not shown) for performing graphic processing in correspondence with video data. The processor 183 may be implemented as a system-on-chip (SoC) in which a core (not shown) and the GPU (not shown) are integrated. The processor 183 may include any of a single-core processor, a dual-core processor, a triple-core processor, a quad-core processor, or a multiple-core processor.

Additionally, the processor 183 may include a plurality of processors. For example, the processor 183 may be implemented as a main processor (not shown) or a sub-processor (not shown) that operates in a sleep mode.

The GPU 184 generates a screen that includes various objects such as an icon, an image or text by using a calculation unit (also referred to herein as a "calculator") (not shown) and a rendering unit (also referred to herein as a "renderer") (not shown). The calculation unit calculates an attribute value of each object to be displayed, such as a coordinate value, a shape, a size, and/or a color of each object, by using user interaction detected by the detection unit 160 according to a layout of a screen. The rendering unit generates a screen of various layouts that includes an object, based on the attribute value calculated by the calculation unit. A screen generated by the rendering unit is displayed on a display area of the flexible display unit 115.

First through nth interfaces 185-1 through 185-*n* are connected to the elements described above. One of the first through nth interfaces 185-1 through 185-*n* may be a network interface which is connected to an external apparatus via a network.

The RAM 181, the ROM 182, the processor 183, the GPU 184, and the first through nth interfaces 185-1 through 185-*n* may be connected to each other via an internal bus 186.

In the current embodiment, a term "controller" may include the RAM 181, the ROM 182, and the processor 183.

According to an exemplary embodiment, the controller 180 included in the foldable device 100 may determine a range of a floating display area, which starts from a boundary between an edge display area and a main display area, according to an angle at which the foldable device 100 is unfolded.

Additionally, according to an exemplary embodiment, the controller 180 included in the foldable device 100 may activate the edge display area if an angle at which the foldable device 100 is unfolded is greater than or equal to a predetermined first angle with respect to a state of being folded.

Additionally, if an angle at which the foldable device 100 is unfolded is greater than or equal to a predetermined second angle, the controller 180 may activate the floating display area.

Additionally, if an angle at which the foldable device 100 is unfolded is increased, the controller 180 may expand a range of the floating display area.

Additionally, if an angle at which the foldable device 100 is unfolded is greater than or equal to a predetermined third angle or greater, the controller 180 may activate the main display area that includes the floating display area.

Additionally, the controller 180 may adjust at least one selected from the group consisting of a type, an amount, and an attribute of content that is to be displayed on the floating display area, according to a range of the floating display area.

Additionally, the controller unit 180 may determine a location from which the floating display area included in the main display area starts, based on a direction in which a user views the foldable device 100.

If the flexible display unit 115 includes a plurality of edge display areas, the controller 180 may determine at least one edge display area that is to be activated from among the plurality of edge display areas, based on an angle at which the foldable device 100 is inclined and a direction in which a user views the foldable device 100 when the foldable device 100 is folded.

Additionally, if at least one event selected from the group consisting of a message reception, a call reception, and an alarm is generated, the controller 180 may activate the edge display area.

It will be easily understood by those of ordinary skill in the art that a configuration and an operation of the controller 180 may vary according to exemplary embodiments.

The storage unit 190 may store any of various data, programs or applications for driving and controlling the foldable device 100 according to control by the controller 180. The storage unit 190 may store a signal and/or data input/output in correspondence with driving of the video processing unit 110, the flexible display unit 115, the audio processing unit 120, the audio output unit 125, the power unit 130, the tuner 140, the communication unit 150, the detection unit 160, and the input/output unit 170. The storage unit 190 may store any one or more of a control program for controlling the foldable device 100 and the controller 180, an application provided as a bundle by a manufacturer or downloaded from outside, a graphical user interface (GUI) related to the application, an object for providing the GUI (for example, image text, an icon, a button, or the like), user information, a document, databases, and/or relevant data.

According to an exemplary embodiment, a term "storage unit" includes the storage unit 190, the ROM 182 or the RAM 181 included in the controller 180, or a memory card (for example, a micro secure digital (SD) or a USB memory, not shown). Additionally, the storage unit 190 may include any of a non-volatile memory, a volatile memory, a hard disk drive (HDD), and/or a solid-state drive (SSD).

The storage unit 190 may include any of a broadcasting receiving module, a channel control module, a volume control module, a communication control module, a voice recognition module, a motion recognition module, an optical receiving module, a display control module, an audio control module, an external input control module, a power control module, a power control module configured for controlling an external apparatus that is wirelessly connected (for example, via Bluetooth) to the foldable device 100, a voice database (DB), and/or a motion DB which are not shown in the drawing. The modules and the databases included in the storage unit 190, which are not shown, may be implemented in the form of software so as to perform a broadcast reception control function, a channel control function, a volume control function, a communication control function, a voice recognition function, a motion recognition function, an optical reception control function, a display control function, an audio control function, an external input control function, a power control function, or a function of controlling power of an external apparatus that is wirelessly connected (for example, via Bluetooth) to the foldable device 100. The control unit 180 may perform each function by using the software stored in the storage unit 190.

Additionally, the foldable device 100 which includes the flexible display unit 115 may be electrically connected to a separate external apparatus which includes a tuner (for example, a set-top box, not shown). For example, it may be easily understood by those of ordinary skill in the art that the foldable device 100 may be implemented as any of an analog television (TV), a digital TV, a 3D TV, a smart TV, a light-emitting diode (LED) TV, an organic light-emitting diode (OLED) TV, a plasma TV, a monitor, and/or the like, but is not limited thereto.

At least one selected from the elements shown respect to the foldable device 100 (for example, the elements 110 through 190) may be further included or may not be included in the foldable device 100, shown in FIG. 3, according to performance of the foldable device 100. Additionally, it will be easily understood by those of ordinary skill in the art that a location of the elements (for example, the elements 110 through 190) may be changed according to performance or a structure of the foldable device 100.

Figure 4:
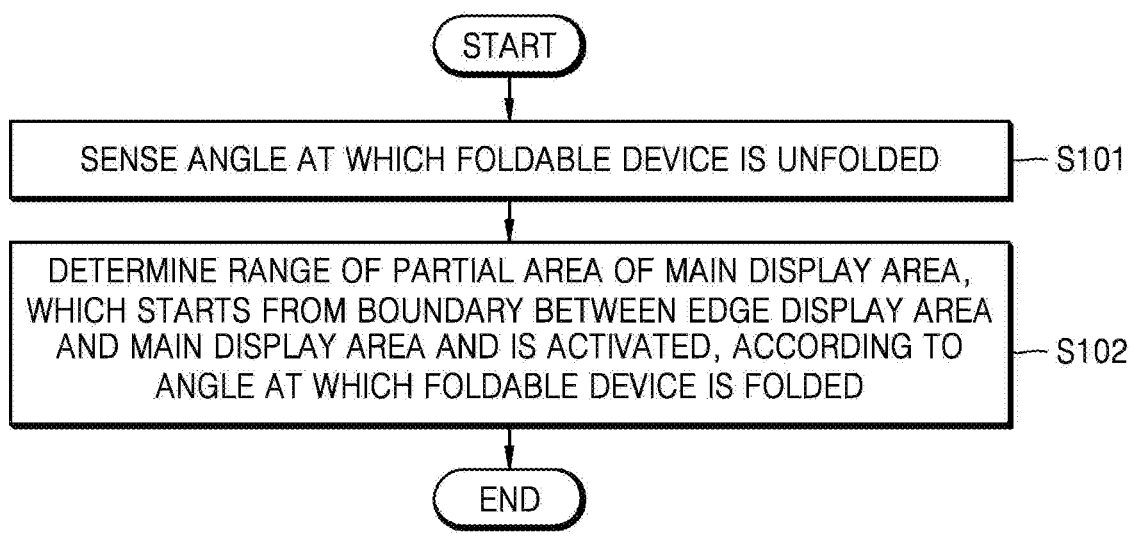
FIGS. 4 and 5 illustrate flowcharts of a method for controlling the foldable device, according to an exemplary embodiment.
Figure 5:
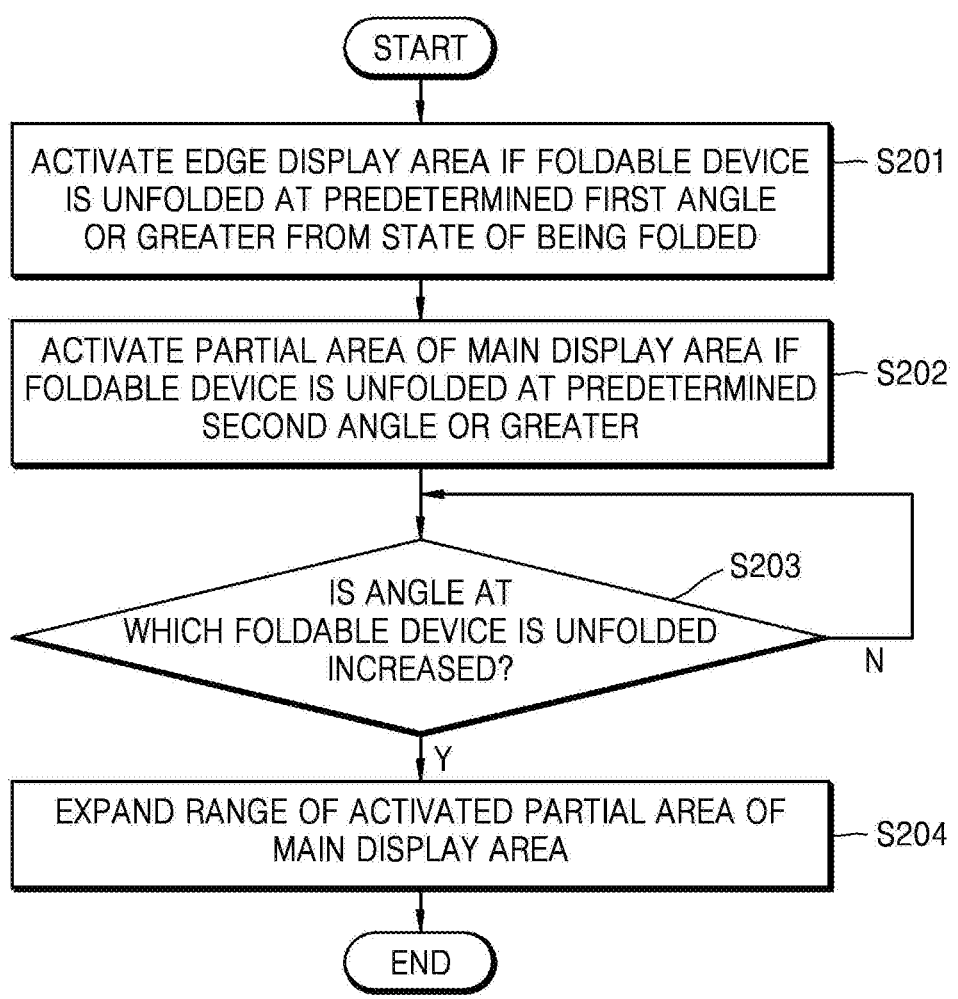
Figure 6:
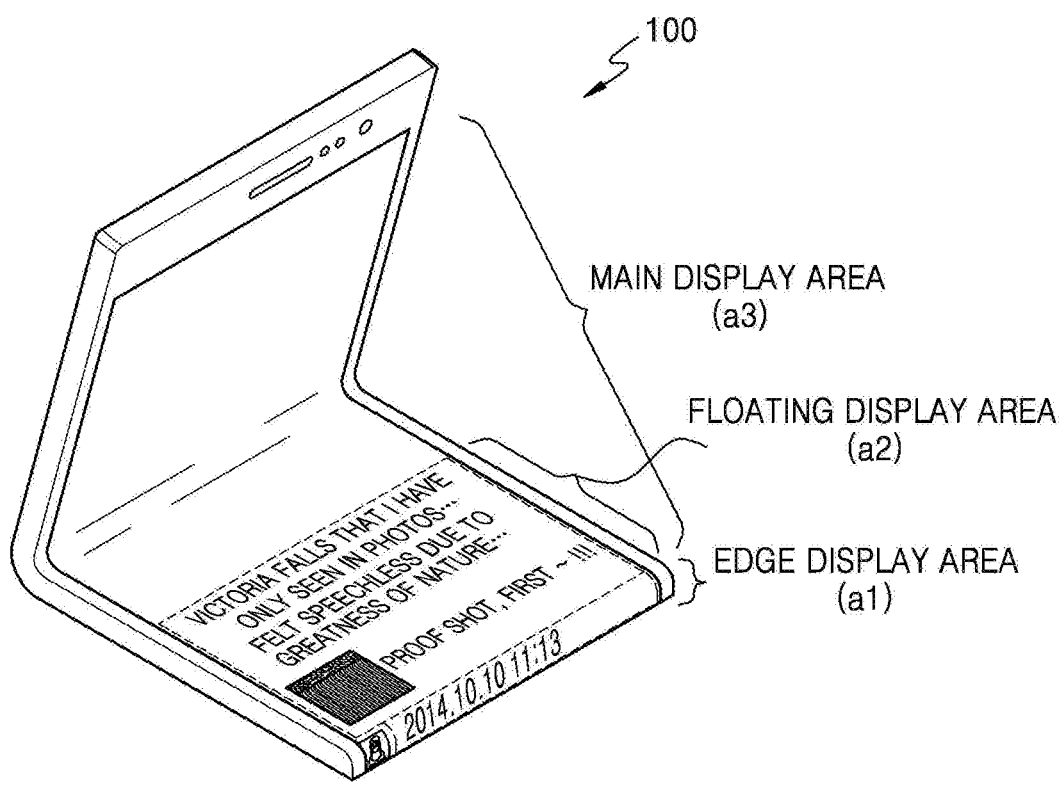
FIG. 6 illustrates a diagram for explaining a configuration of a flexible display unit, according to an exemplary embodiment.

FIGS. 4 and 5 illustrate a flowchart of a method for controlling the foldable device 100, according to an exemplary embodiment. FIG. 6 illustrates a diagram for explaining a configuration of the flexible display unit 115, according to an exemplary embodiment. FIGS. 7, 8A, 8B, 8C, 9A, 9B, 9C, 10A, 10B, 11A, and 11B illustrate diagrams for explaining an example of expanding a range of a floating display area as an angle at which the foldable device is unfolded is increased, according to an exemplary embodiment.

According to an exemplary embodiment, as the foldable device 100 is gradually unfolded from a state of being folded, the foldable device 100 may activate a partial area of a main display area, which starts from an edge display area and may be viewed by a user (hereinafter, for convenience of description, referred to as a "floating display area"), and provide certain content. Each display area will be described in detail below with reference to FIG. 6.

According to an exemplary embodiment, the foldable device 100 may variably adjust the partial area that is activated based on an angle at which the foldable device is unfolded (hereinafter, referred to as a "floating display area"), and sequentially provide an increasingly large amount of relevant content based on a range of the floating display area, which is gradually expanded in accordance with an increase in the angle at which the foldable device is unfolded.

Referring to FIG. 4, in operation S101, the controller 180 included in the foldable device 100 may sense an angle at which the foldable device 100 is unfolded.

According to an exemplary embodiment, the controller 180 included in the foldable device 100 may sense an angle at which the foldable device 100 is unfolded, via the sensing unit 140 that includes the magnetic sensor 141, the acceleration sensor 142, the gyroscope sensor 145, or the like.

In operation S102 as illustrated in FIG. 4, the controller 180 included in the foldable device 100 may determine a range of a partial activation area that starts from a boundary between an edge display area and a main display area and is activated (hereinafter, the "floating display area") from within the main display area, based on an angle at which the foldable device is unfolded.

Referring to FIG. 6, the flexible display unit 115 may consist of a main display area a3, a floating display area a2, and an edge display area a1. A name of each display area is provided for convenience of description, and does not refer to a limited area.

The "main display area" a3 may refer to an entirety of an area that is located at both surfaces that face each other when the foldable device 100 is folded, from within an area of the flexible display unit 115. Accordingly, the main display area a3 may refer to an area that is not exposed to the outside when the foldable device 100 is folded.

The edge display area a1 is a display area that is located on at least one edge surface from among left, right, upper, and lower edge surfaces of the foldable device 100. The edge display area a1 may refer to an area that is exposed to the outside when the foldable device 100 is folded.

The edge display area a1 may be physically located at a surface that extends from the main display area a3. The flexible display unit 115 that is flexible may be bent at a certain angle or greater at a boundary between the main display area a3 and the edge display area a1. The "floating display area" a2 is a partial area of the main display area a3, and may refer to a partial activation area that is activated based on an angle at which the foldable device 100 is unfolded. The floating display area a2 may start from a boundary between the edge display area a1 and the main display area a3.

A range of the floating display area a2 may vary based on an angle at which the foldable device 100 is unfolded. The floating display area a2 is an area that is activated when an angle at which the foldable device 100 is unfolded is greater than or equal to a certain angle. If an angle at which the foldable device 100 is unfolded is 0°, that is, if the foldable device 100 is in a state of being folded, a floating display area may not be generated. Additionally, if the angle at which the foldable device 100 is unfolded is increased, the controller 180 may expand a range of the floating display area (refer to operation S204 that is to be described below with reference to FIG. 6).

In this aspect, the controller 180 included in the foldable device 100 may determine a range of the floating display area based on an angle at which the foldable device 100 is unfolded.

FIG. 5 illustrates a flowchart that relates to an activation of each display area.

In operation S201 as illustrated in FIG. 5, if an angle at which the foldable device 100 is unfolded is greater than or equal to a predetermined first angle with respect to being folded, the controller 180 included in the foldable device 100 may activate an edge display area.

Figure 7:
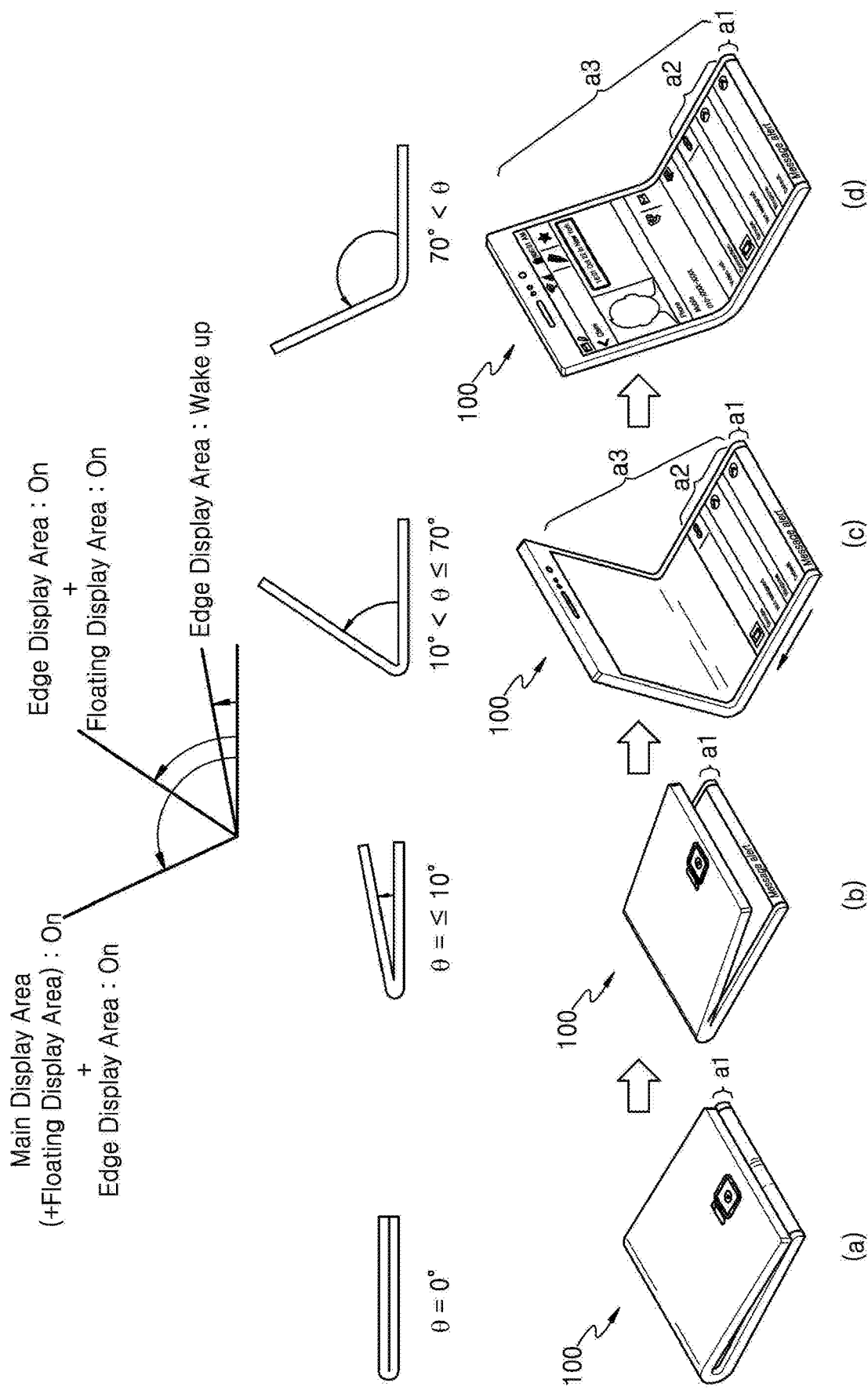
FIGS. 7, 8A, 8B, 8C, 9A, 9B, 9C, 10A, 10B, 11A, and 11B illustrate diagrams for explaining an example of expanding a range of a floating display area as an angle at which the foldable device is unfolded is increased, according to an exemplary embodiment.

Referring to view (a) of FIG. 7, when the foldable device 100 is folded, an edge display area a1 may be in a deactivation state.

The term "deactivation state" refers to a state when the flexible display unit 115 is turned off, and a state when the flexible display unit 115 may be turned on if a preset trigger (for example, a generation of a new event such as an input of a key provided outside the foldable device 100, a message reception, and/or a preset alarm) is generated.

Referring to view (b) of FIG. 7, as the foldable device 100 is unfolded from a state of being folded, the controller 180 may activate the edge display area a1. For example, if an angle at which the foldable device 100 is unfolded is greater than or equal to a predetermined angle (for example, 0°≤θ≤10°) the controller 180 may activate the edge display area a1.

When each display area is "activated," a wallpaper that is preset as a default may be displayed. Additionally, if a display area is "activated" when a particular event is generated, a screen indicating the generated particular event may be displayed. If a display area is "activated" when a particular application is executed, an execution screen that relates to the particular application may be displayed.

In particular, an "activation" state of a display area may refer to a state that exists when certain content is displayed on the display area.

As another example, if a new event (for example, a message reception, a call reception, or the like) is generated when the foldable device 100 is folded as shown in view (a) of FIG. 7, the controller 180 may activate the edge display area a1.

In operation S202 as illustrated in FIG. 5, if an angle at which foldable device 100 is unfolded is greater than or equal to a predetermined second angle, the controller 180 included in the device 100 may activate a partial area (i.e., "a floating display area") of a main display area. For example, as shown in view (c) of FIG. 7, if the foldable device is unfolded at an angle that is greater than a predetermined second angle (for example, 10°<θ), the controller 180 may activate the floating display area a2.

In operation S203 as illustrated in FIG. 5, the controller 180 included in the device 100 may determine whether an angle at which the foldable device 100 is unfolded is increased.

In operation S204 as illustrated in FIG. 5, if the controller 180 determines via the sensing unit 140 that the angle at which the foldable device 100 is unfolded is increased as the controller 180 is gradually unfolded, the controller 180 may expand a range of the partial area (i.e., "the floating display area") that is activated, from within the main display area. For example, as shown in view (c) of FIG. 7, the controller 180 may expand a range of the floating display area a2 that starts from a boundary between the edge display area a1 and the main display area a3.

Referring to view (d) of FIG. 7, if it is determined that an angle at which the foldable device 100 is unfolded is greater than a predetermined third angle (for example, 70°<θ), the controller 180 may activate the entirety of the main display area a3 that includes the floating display area a2.

Then, the controller 180 may display a wallpaper or an application execution screen as one area on the whole main display area a3 that includes the floating display area a2.

Additionally, if the whole main display area a3 of the foldable device 100 is activated, the controller 180 may display the main display area a3 so that the floating display area a2 may be distinguished from a remaining area of the main display area a3 which is outside of the floating display area a2, based on an execution area of an application. For example, if a video playback application is executed, the controller 180 may display an interface for controlling video playback on the floating display area a2, and a video clip that is being played on a remaining area of the main display area a3 outside of the floating display a2.

FIGS. 8A, 8B, 8C, 9A, 9B, 9C, 10A, 10B, 11A, and 11B illustrate examples of displaying content based on a range of the floating display area a2.

According to an exemplary embodiment, the controller 180 displays content on the edge display area a1 and displays detailed content, related to the content displayed on the edge display area a1, on an activated partial area (the floating display area a2) of the main display area a3.

For example, if content displayed on the edge display area a1 is a title of a message, detailed content displayed on the floating display area a2 may be a description of the message. Additionally, if content displayed on the edge display area a1 is a title that relates to music that is being played, detailed content displayed on the floating display area a2 may be an image related to the music that is being played, detailed information about the music that is being played, and/or the like.

Figure 8A:
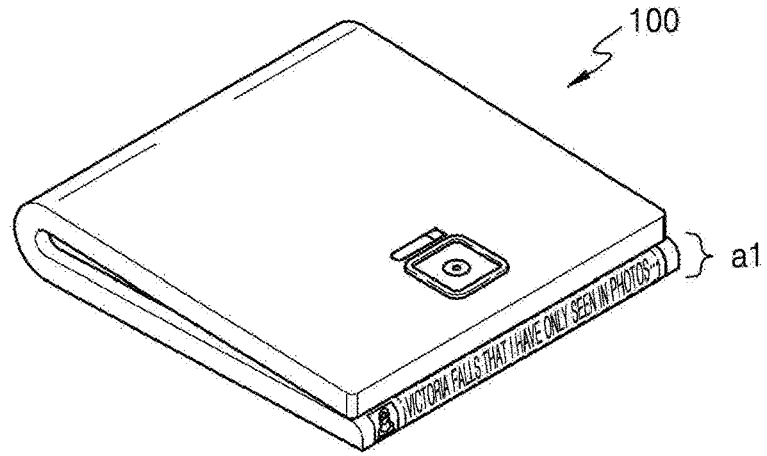
Figure 8B:
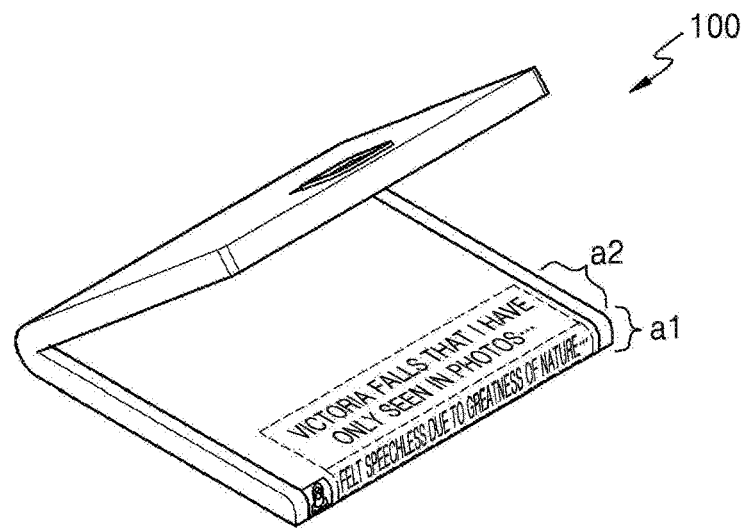
Figure 8C:
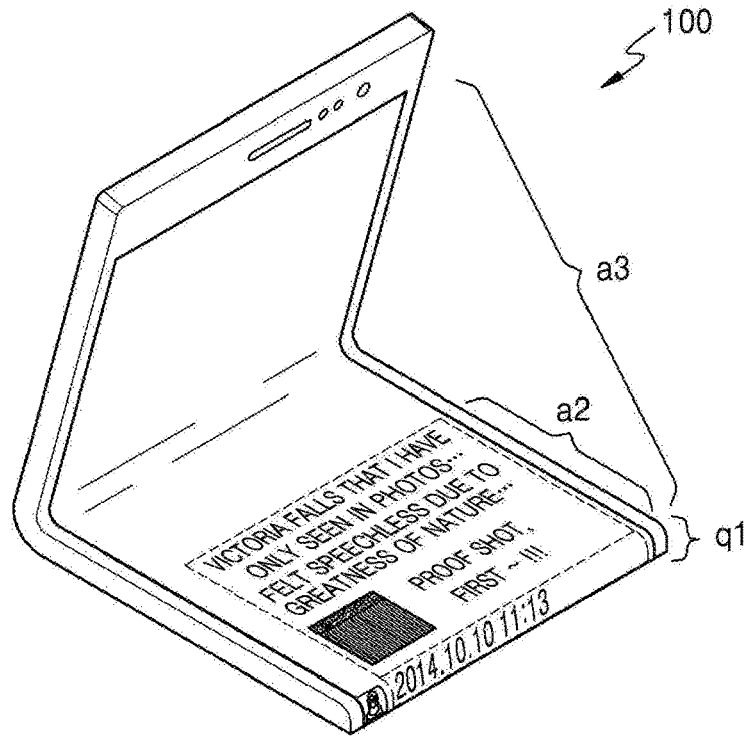

Referring to FIGS. 8A, 8B, and 8C, as the foldable device 100 is unfolded from a state of being folded, the controller 180 may expand a range of the floating display area a2. Additionally, the controller 180 may adjust a type of content that is to be displayed on the floating display area a2, based on a range of the floating display area a2.

For example, referring to FIG. 8A, if the foldable device 100 displays content that includes a title, description, and an image on the flexible display unit 115 in accordance with an execution of a memo application, when the foldable device 100 is folded, the controller 180 may display only the title on the edge display area a1.

Referring to FIG. 8B, if an angle at which the foldable device 100 is unfolded is greater than or equal to a certain angle, the controller 180 may activate the floating display area a2, and display the description on the floating display area a2.

Additionally, as shown in FIG. 8C, as an angle at which the foldable device 100 is unfolded is increased, the controller 180 may expand a range of the floating display area a2. Accordingly, the controller 180 may further display an image on the floating display area a2.

Figure 9A:
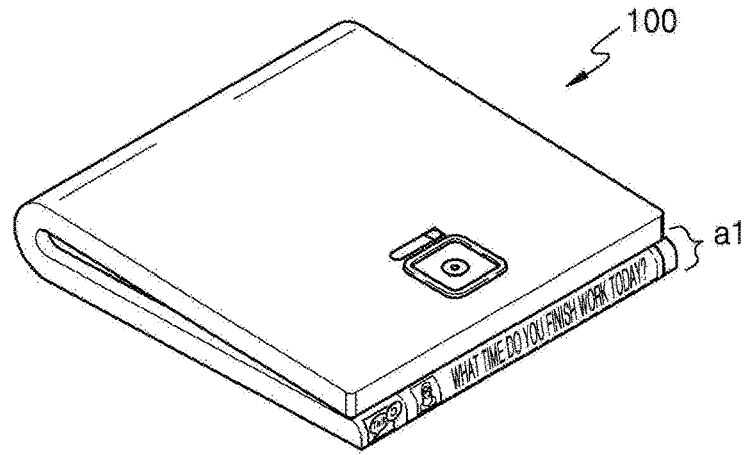
Figure 9B:
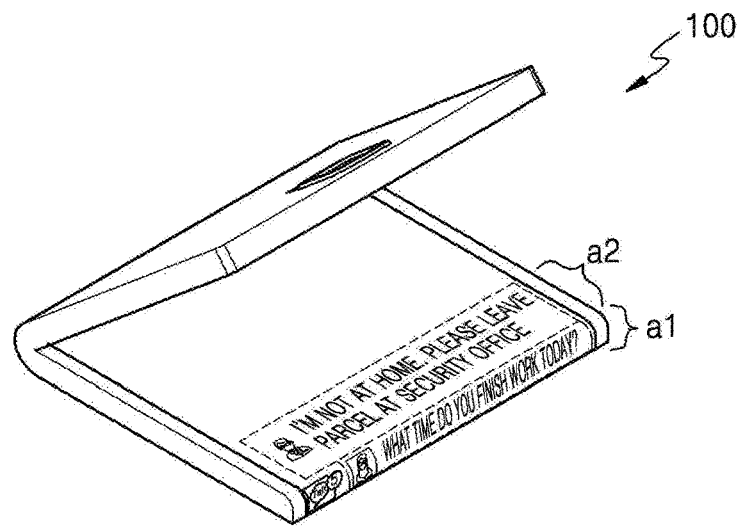
Figure 9C:
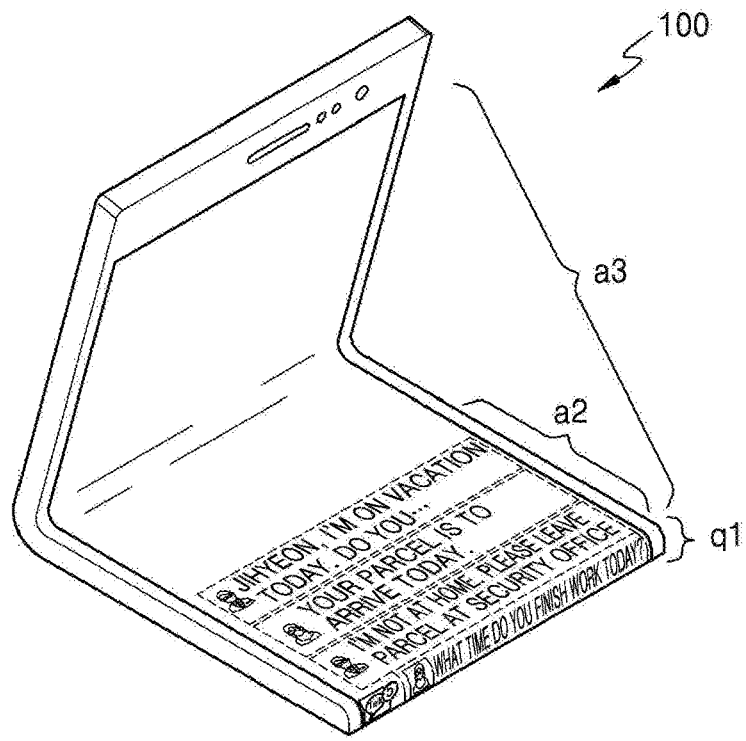

In particular, as a range of the floating display area a2 is expanded, the controller 180 may determine a type of content that is to be displayed on the floating display area a2. Referring to FIGS. 9A, 9B, and 9C, if the foldable device 100 is unfolded from a state of being folded, the controller 180 may expand a range of the floating display area a2, and adjust an amount of content that is to be displayed on the floating display area a2.

For example, referring to FIG. 9A, if the foldable device 100 displays a list of messages in correspondence with an execution of a message application, when the foldable device 100 is folded, the controller 180 may display one message in the list of the messages on the edge display area a1.

When the foldable device 100 is folded, if an event of message reception is generated, the controller 180 may activate the edge display area a1, and display a title or a part of a description that relates to the received message.

Referring to FIG. 9B, if an angle at which the foldable device 100 is unfolded is greater than or equal to a predetermined angle, the controller 180 may activate the floating display area a2, and display another message from within the list of the messages on the floating display area a2.

According to an another exemplary embodiment, if an angle at which the foldable device 100 is unfolded is greater than or equal to a predetermined angle, the controller 180 may activate the floating display area a2, and further display a remaining description of the message displayed on the edge display area a1.

Additionally, as shown in FIG. 9C, as an angle at which the foldable device 100 is unfolded is increased, the controller 180 may expand a range of the floating display area a2. Accordingly, the controller 180 may further display another message from within the list of the messages on the floating display area a2.

In this aspect, as the controller 180 expands a range of the floating display area a2, the controller 180 may increase an amount of content that is to be displayed on the floating display area a2.

Figure 10A:
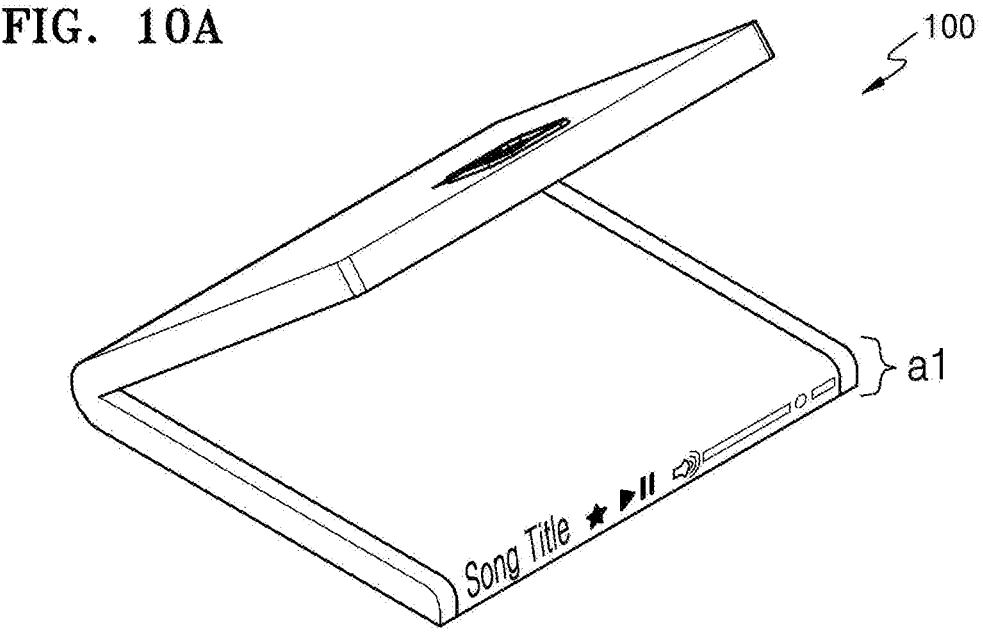
Figure 10B:
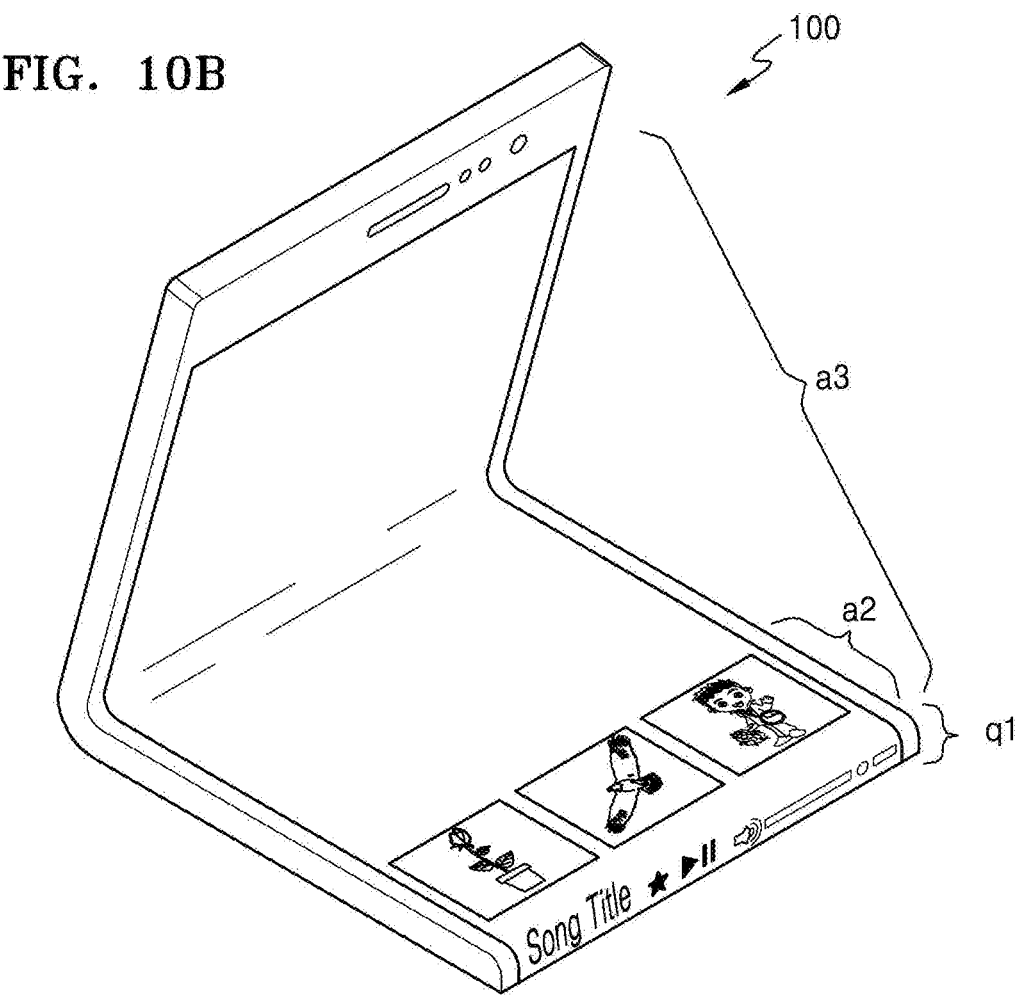

Referring to FIGS. 10A and 10B, as the foldable device 100 is unfolded, the controller 180 may expand a range of the floating display area a2, and adjust an attribute of content that is to be displayed on the floating display area a2.

For example, referring to FIG. 10A, when the foldable device 100 displays an interface related to music playback on the flexible display unit 115 in accordance with an execution of a music playback application, if the foldable device 100 is in a state of being unfolded at a predetermined angle or a lesser angle, the controller 180 may display only a music playback control area on the edge display area a1.

Referring to FIG. 10B, if an angle at which the foldable device 100 is unfolded is greater than or equal to a predetermined angle as an angle at which the foldable device 100 is unfolded is increased, the controller 180 may activate the floating display area a2, and display an image related to a music playback list on the floating display area a2.

Figure 11A:
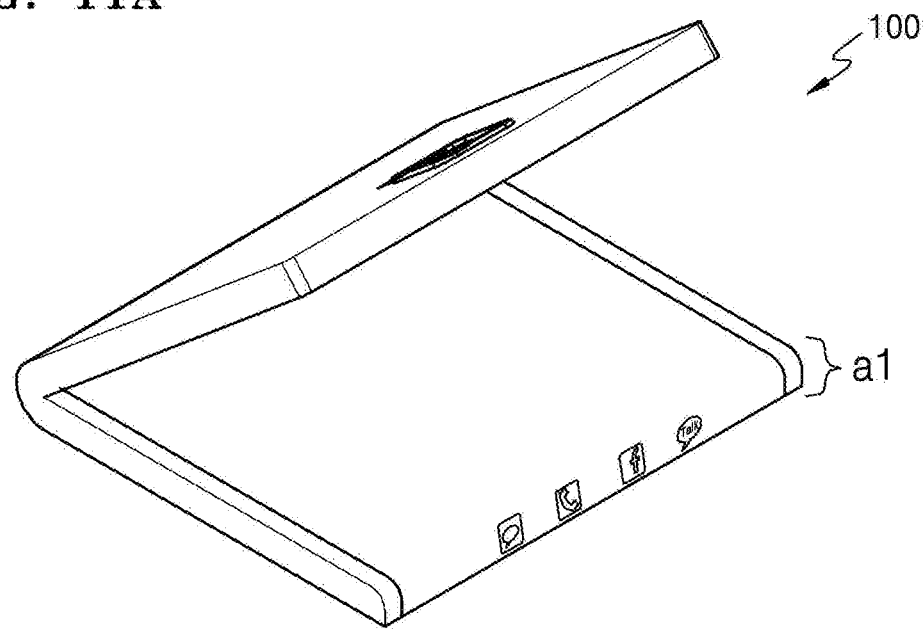
Figure 11B:
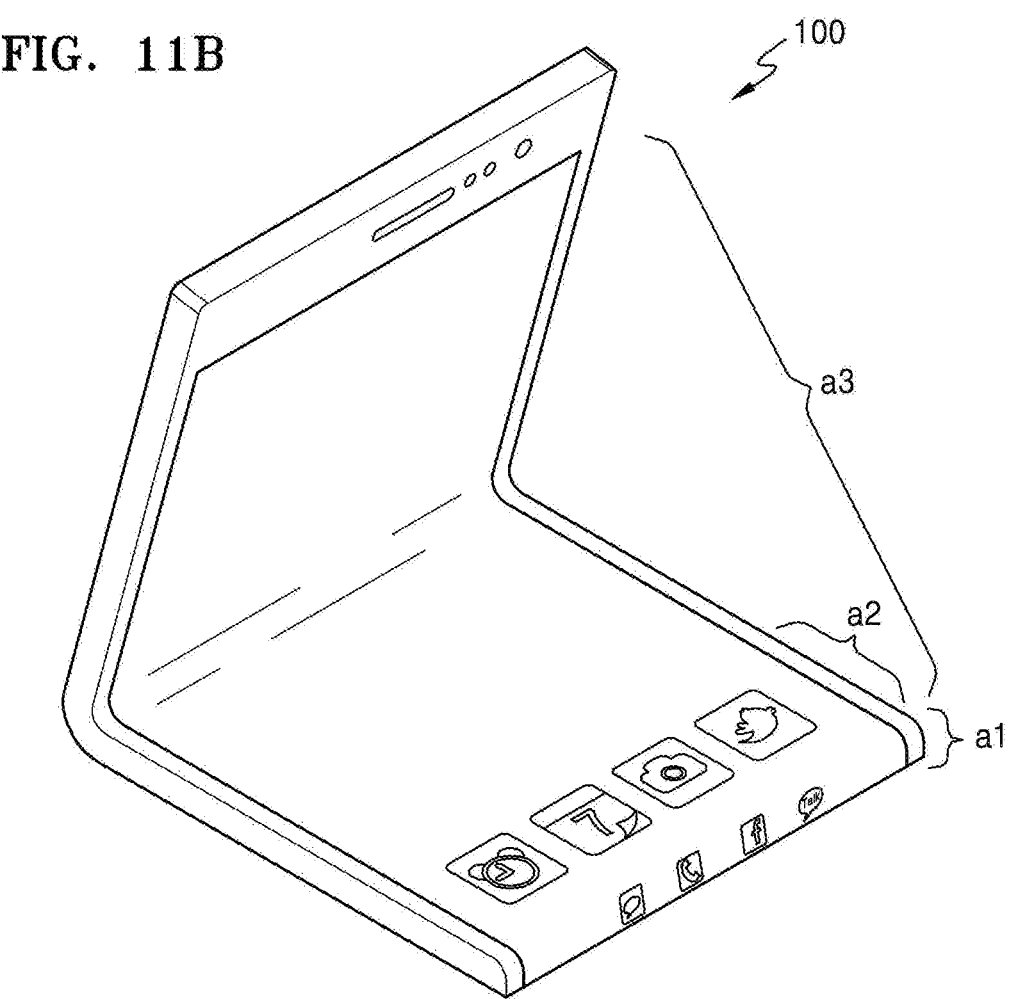

Referring to FIGS. 11A and 11B, as the foldable device 100 is unfolded, the controller 180 may expand a range of the floating display area a2 and adjust a number of pieces of content that is to be displayed on the floating display area a2.

For example, referring to FIG. 11A, when the foldable device 100 displays an icon that corresponds to an application, if the foldable device 100 is in a state of being folded at a predetermined angle or a lesser angle, the controller 180 may display only a predetermined number of icons on the edge display area a1.

Referring to FIG. 11B, as an angle at which the foldable device 100 is unfolded is increased, if the angle at which the foldable device 100 is unfolded is greater than or equal to a certain angle, the controller 180 may activate the floating display area a2 and further display additional icons that correspond to the application on the floating display area a2.

FIGS. 12A, 12B, 13A, 13B, and 13C illustrate diagrams for explaining an example of displaying an edge display area as an angle at which the foldable device is unfolded is increased, according to an exemplary embodiment.

Figure 12A:
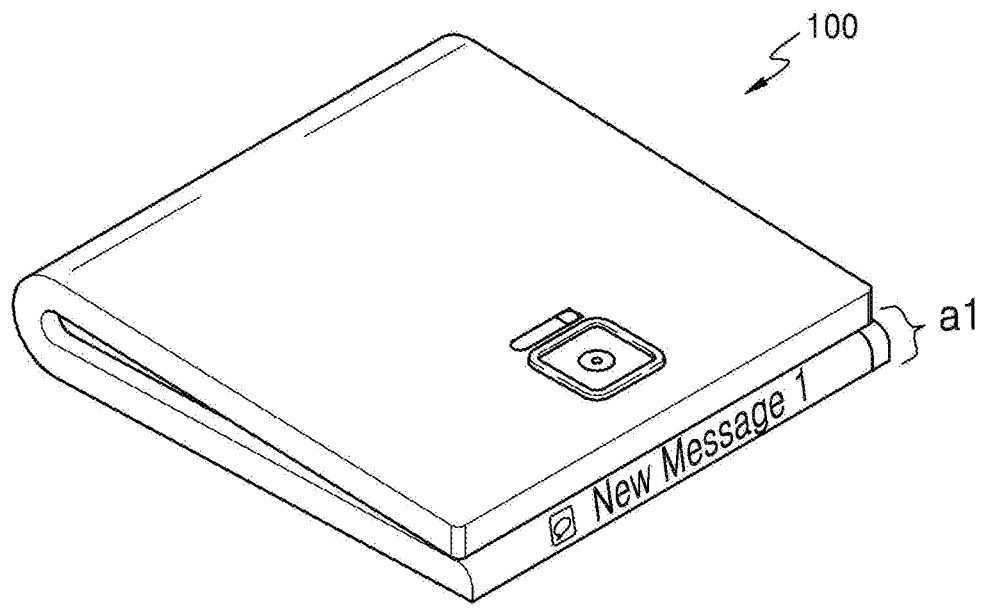
FIGS. 12A, 12B, 13A, 13B, and 13C illustrate diagrams for explaining an example of displaying an edge display area as an angle at which the foldable device is unfolded is increased, according to an exemplary embodiment.
Figure 12B:
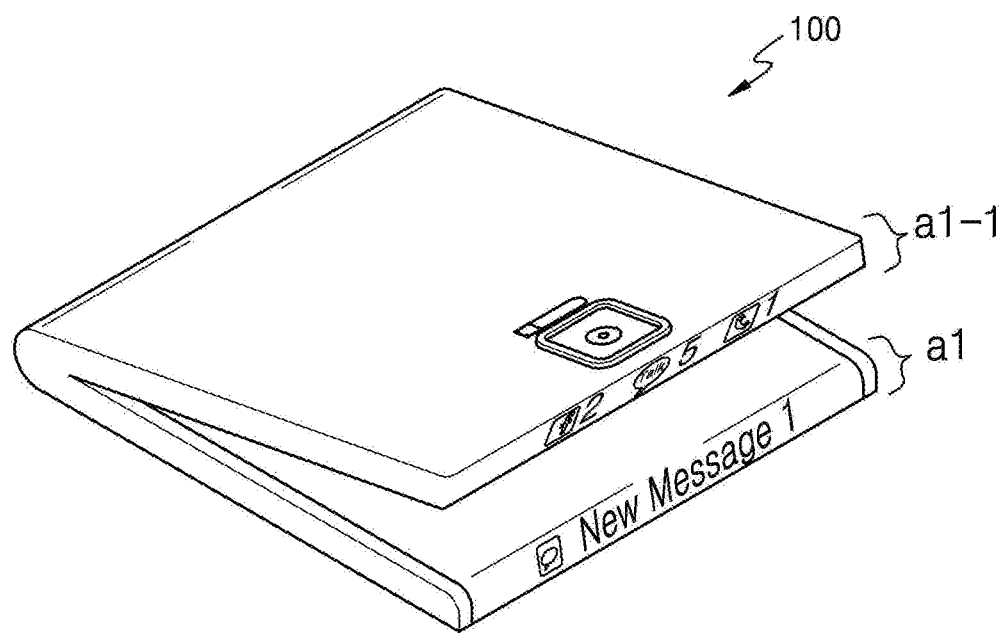

Referring to FIG. 12A and FIG. 12B, as the foldable device 100 is unfolded from a state of being folded, the controller 180 may activate an edge display area a1-1.

For example, referring to FIG. 12A, as an event is generated, when the foldable device 100 displays details regarding the generated event, if the foldable device 100 is in a state of being folded, the controller 180 may display an event in an event list on the edge display area a1. The details about the event may include an indication of an unidentified message, an indication of a missed call, or the like.

Referring to FIG. 12B, if an angle at which the foldable device 100 is unfolded is greater than or equal to a predetermined angle, the controller 180 may activate another edge display area a1-1, and display another event in the event list on the edge display area a1-1.

In this aspect, as the foldable device 100 is unfolded, the controller 180 may increase an activated edge display area to include the edge display areas a1 and a1-1 by activating the edge display area a1-1.

Figure 13A:
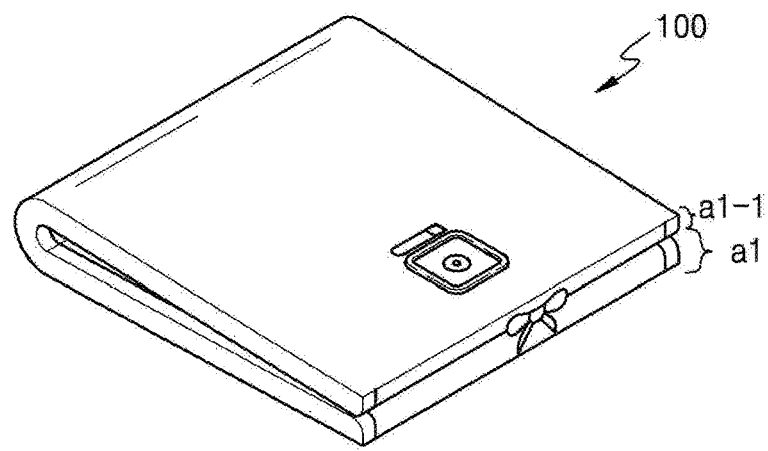
Figure 13B:
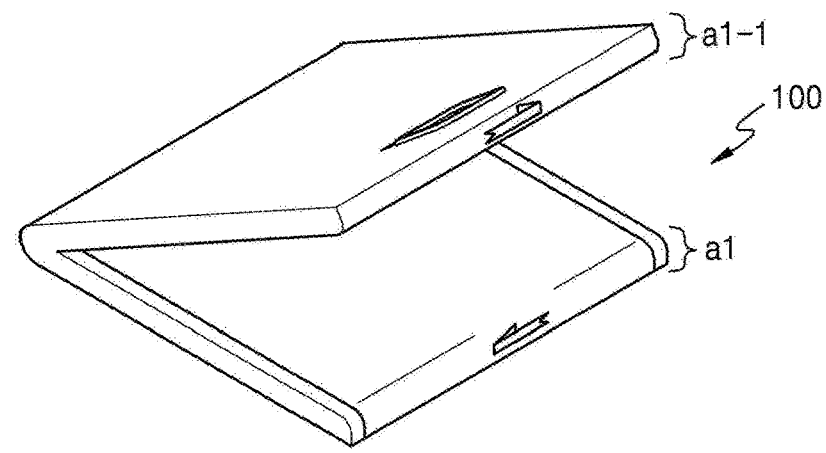
Figure 13C:
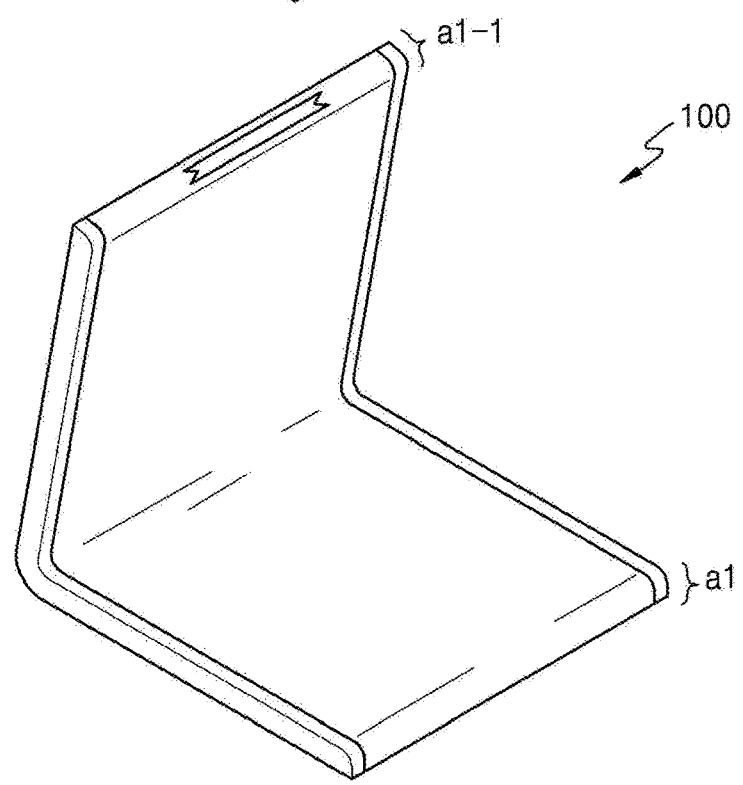

FIGS. 13A, 13B, and 13C illustrate an example of displaying the edge display areas a1 and a1-1 as the foldable device 100 is unfolded from a state of being folded.

As shown in FIGS. 13A, 13B, and 13C, as the foldable device 100 is unfolded, the controller 180 may provide an interface for showing an animation effect on each of the edge display areas a1 and a1-1.

Figure 14:
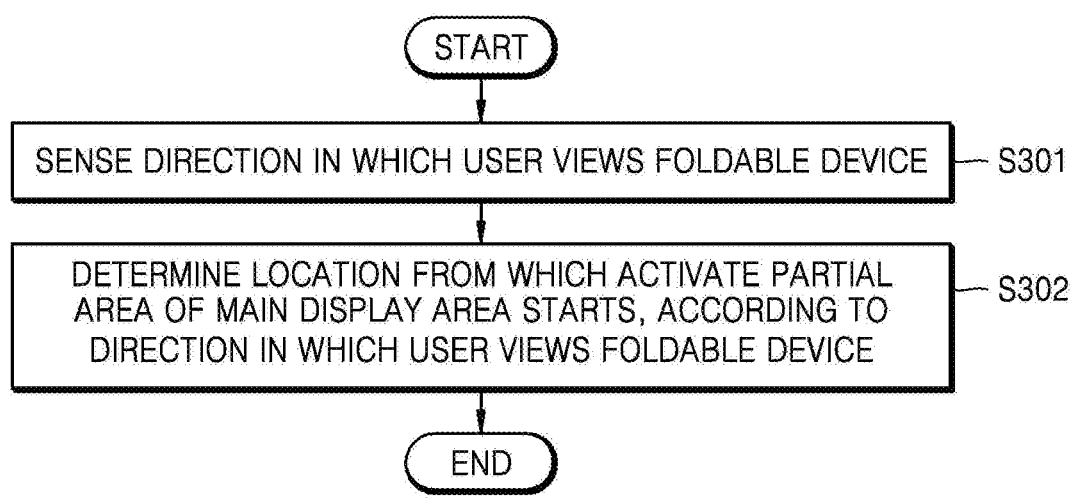
FIG. 14 illustrates a flowchart of a method for controlling a floating display area based on a direction in which a user views the foldable device, according to an exemplary embodiment.
Figure 15C:
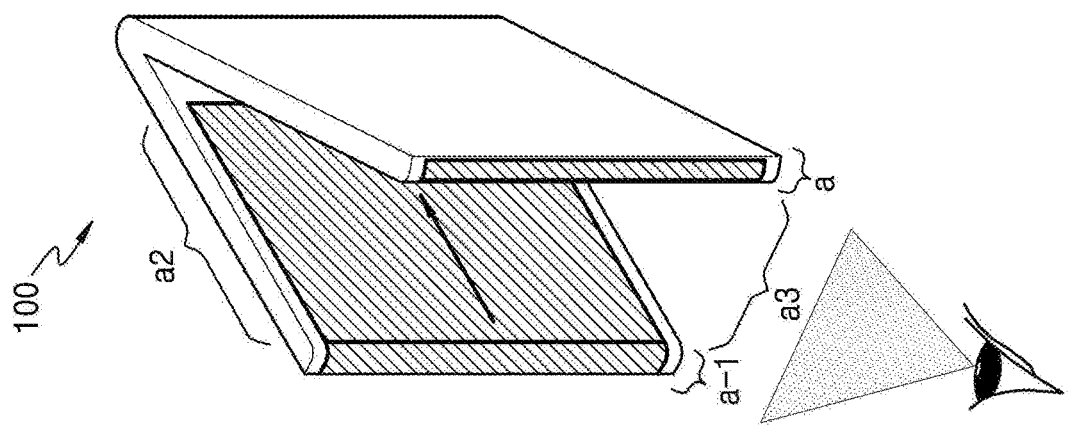
FIGS. 15A, 15B, and 15C illustrate diagrams for explaining a method for controlling a floating display area based on a direction in which a user views the foldable device, according to an exemplary embodiment.
Figure 15B:
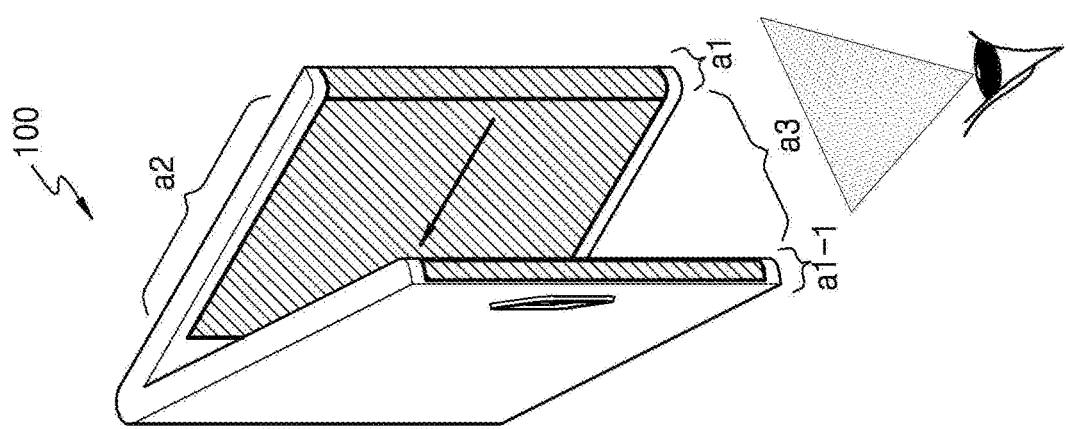
Figure 15A:
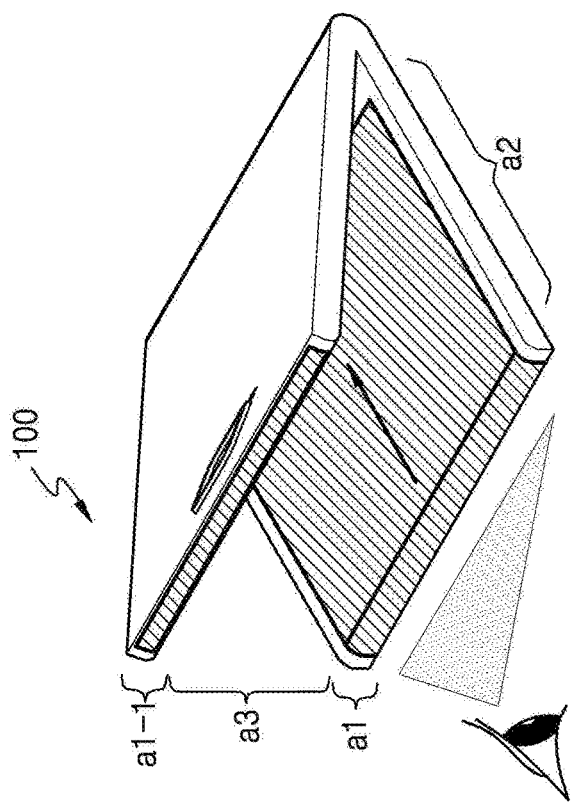

FIG. 14 illustrates a flowchart of a method for controlling a floating display area based on a direction in which a user views the foldable device 100, according to an exemplary embodiment. FIGS. 15A, 15B, and 15C illustrate diagrams for explaining a method for controlling the floating display area a2 based on a direction in which a user views the foldable device 100, according to an exemplary embodiment.

In operation S301 as illustrated in FIG. 14, the controller 180 included in the foldable device 100 may sense a direction in which a user views the foldable device 100. For example, the foldable device 100 may sense a direction in which a user views the foldable device 100 via the camera unit 162 or the sensing unit 140.

In operation S302 as illustrated in FIG. 14, the controller 180 included in the foldable device 100 may determine a location from which a partial area that is activated (i.e., a "floating display area"), from within the main display area, starts, based on the sensed direction in which the user views the foldable device 100.

Referring to FIG. 15A, if the foldable device 100 is placed in a lengthwise direction, and an upper surface of the foldable device 100 is open and unfolded, the floating display area a2 may start from a boundary between the first edge display area a1 and the main display area a3.

In particular, the floating display area a2 may be generated in a location that may be easily viewed by a user according to a direction in which the user views the foldable device 100.

Referring to FIG. 15B, if the foldable device 100 is placed in a longitudinal direction, and a right surface of the foldable device 100 is open and unfolded, the floating display area a2 may start from a boundary between the first edge display area a1 and the main display area a3.

Referring to FIG. 15C, if the foldable device 100 is placed in a longitudinal direction, and a left surface of the foldable device 100 is open and unfolded, the floating display area a2 may start from a boundary between a second edge display area a1-1 and the main display area a3.

Figure 16:
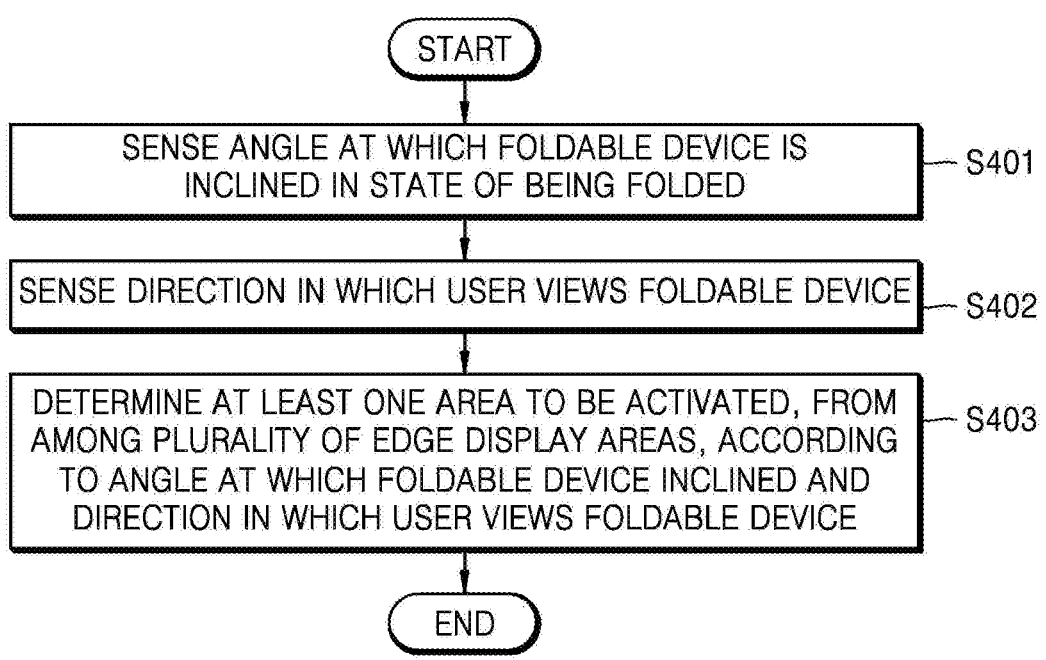
FIG. 16 illustrates a flowchart of a method for controlling an edge display area based on a direction in which a user views the foldable device, according to an exemplary embodiment.
Figure 17A:
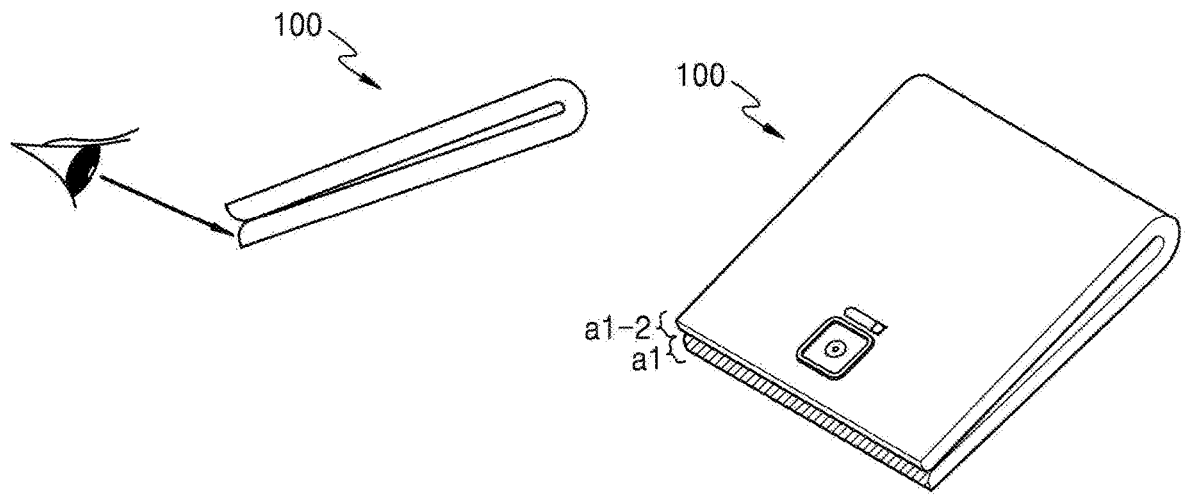
FIGS. 17A, 17B, and 17C illustrate diagrams for explaining a method for controlling an edge display area based on a direction in which a user views the foldable device, according to an exemplary embodiment.
Figure 17B:
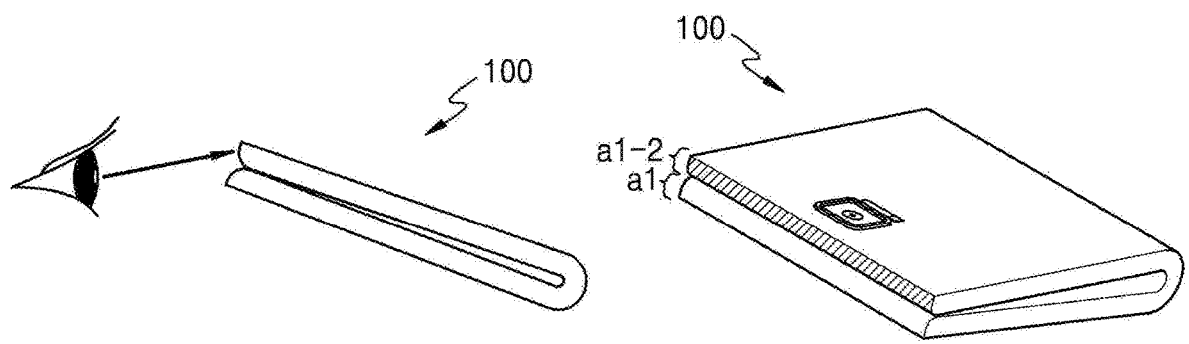
Figure 17C:
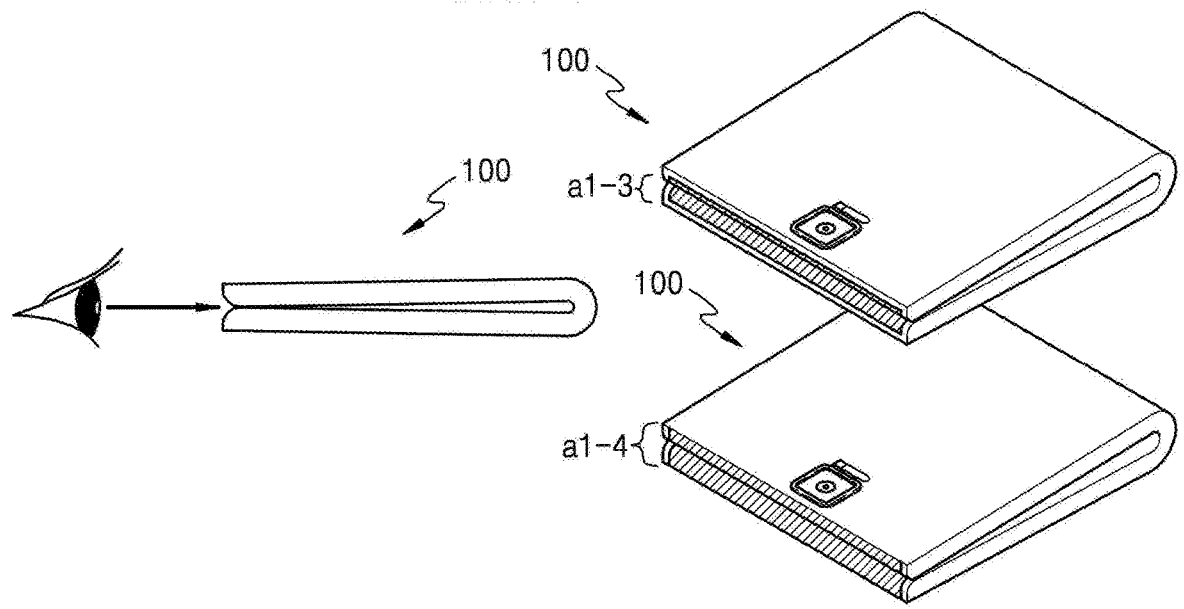

FIG. 16 illustrates a flowchart of a method for controlling an edge display area based on a direction in which a user views the foldable device 100, according to an exemplary embodiment. FIGS. 17A, 17B, and 17C illustrate diagrams for explaining a method for controlling edge display areas based on a direction in a user views the foldable device 100, according to an exemplary embodiment.

According to an exemplary embodiment, if the flexible display unit 115 includes a plurality of edge display areas, the controller 180 may determine at least one edge display area that is to be activated, selected from the group consisting of the plurality of edge display areas, based on an angle at which the foldable device 100 is inclined in a state of being folded and a direction in which a user views the foldable device 100.

In operation S401 as illustrated in FIG. 16, the controller 180 included in the foldable device 100 may sense an angle at which the foldable device 100 is inclined in a state of being folded.

According to an exemplary embodiment, the controller 180 included in the foldable device 100 may sense an angle at which the foldable device 100 is inclined in a state of being folded, via the sensing unit 140 that includes the magnetic sensor 141, the acceleration sensor 142, the gyroscope sensor 145, or the like.

In operation S402 as illustrated in FIG. 16, the controller 180 included in the foldable device 100 may sense a direction in which a user views the foldable device 100. For example, the foldable device 100 may sense a direction in which a user views the foldable device 100 via the camera unit 162 or the sensing unit 140.

In operation S403 as illustrated in FIG. 16, the controller 180 included in the foldable device 100 may determine at least one edge display area that is to be activated, selected from the group consisting of a plurality of edge display areas, based on the sensed angle at which the foldable device 100 is inclined and the sensed direction in which the user views the foldable device 100.

As shown in FIG. 17A, if the foldable device 100 is inclined in a state of being folded, the controller 180 may activate the first edge display area a1 that is located at a lower part of the foldable device 100 and display content on the first edge display area a1, based on a direction in which the user views the foldable device 100.

Additionally, as shown in FIG. 17B, if the foldable device 100 is inclined in a state of being folded, the controller 180 may activate a second edge display area a1-2 that is located at an upper part of the foldable device 100 and display content on the second edge display area a1-2, based on a direction in which the user views the foldable device 100.

Additionally, as shown in FIG. 17C, when the foldable device 100 is in a state of being folded, if a user's eye level corresponds to a level of edge display areas, the controller 180 may activate intermediate areas (for example, a1-3 or a1-4) of the first and second edge display areas a1 and a1-2 so that the intermediate areas a1-3 or a1-4 are respectively viewed as one area, and display content on the intermediate areas (for example, a1-3 and/or a1-4).

Figure 18A:
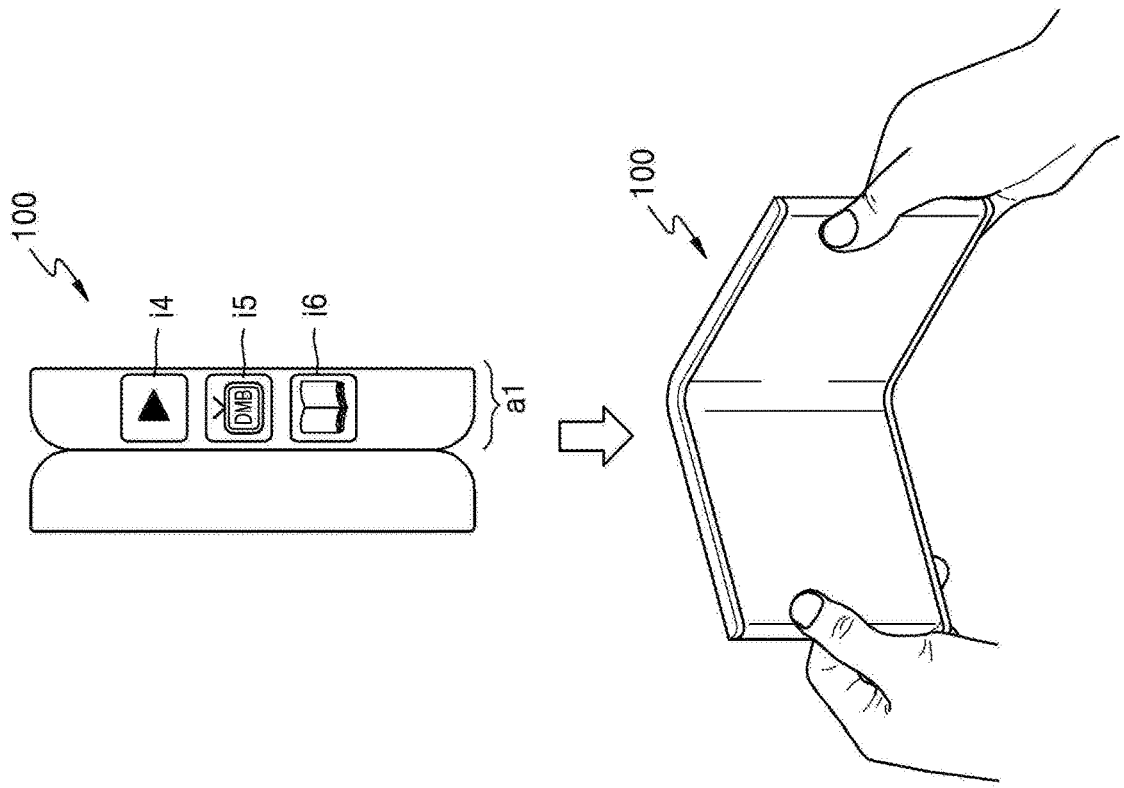
FIGS. 18A and 18B illustrate diagrams for explaining a method for controlling an edge display area based on a direction in which the foldable device faces, according to an exemplary embodiment.
Figure 18B:
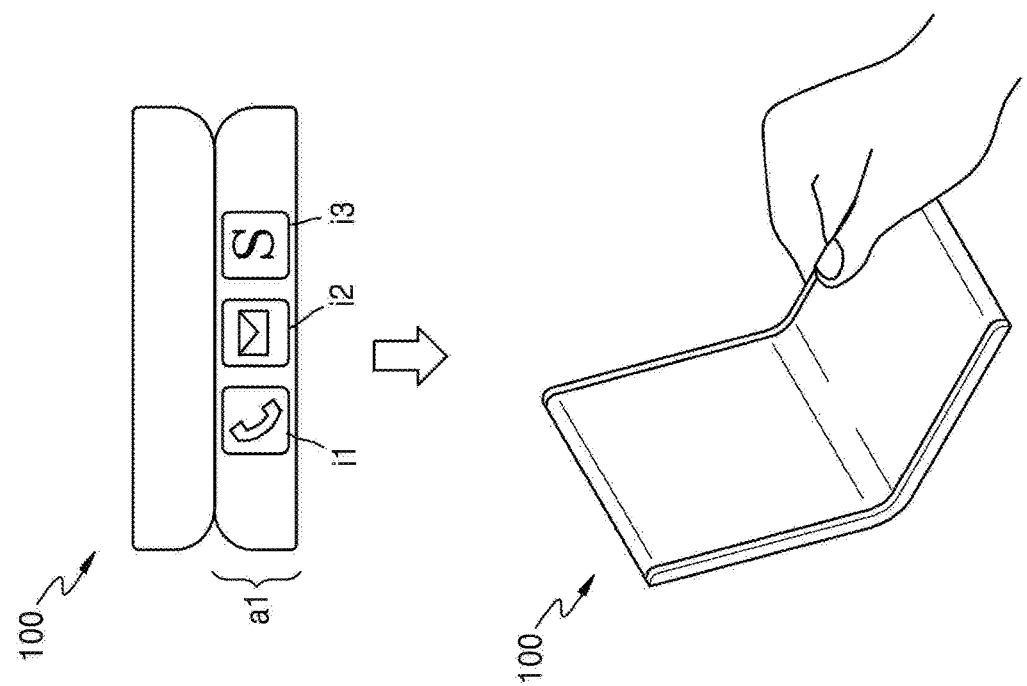

FIGS. 18A and 18B illustrate diagrams for explaining a method of controlling an edge display area based on a direction in which the foldable device 100 faces, according to an exemplary embodiment.

Referring to FIG. 18A, if the foldable device 100 is unfolded from a state of being folded when the foldable device 100 is placed in a lengthwise direction, the foldable device 100 may be unfolded in a longitudinal direction with reference to a direction in which a user views the foldable device 100. Accordingly, if the foldable device 100 is placed in a lengthwise direction in a state of being folded, the controller 180 may display an icon that corresponds to an application that is appropriate to be executed in the longitudinal direction when the foldable device 100 is unfolded. For example, the controller 180 may display icons i1, i2, and i3, which respectively correspond to a phone application, a message application, and a note application.

Additionally, the controller 180 may display an icon that corresponds to an application that has been executed several times when the foldable device 100 is unfolded in a longitudinal direction.

Referring to FIG. 18B, if the foldable device 100 is unfolded from a state of being folded in a longitudinal direction, the foldable device 100 may be unfolded in a longitudinal direction with reference to a direction in which a user views the foldable device 100. Accordingly, if the foldable device 100 is placed in a longitudinal direction in a state of being folded, the controller 180 may display an icon that corresponds to an application that is appropriate to be executed in the lengthwise direction when the foldable device 100 is unfolded. For example, the controller 180 may display icons i4, i5, and i6, which respectively correspond to a video playback application, a digital multimedia broadcasting (DMB) application, and an electronic book application.

Additionally, the controller 180 may display an icon that corresponds to an application that has been executed several times when the foldable device 100 is unfolded in a lengthwise direction.

Figure 19A:
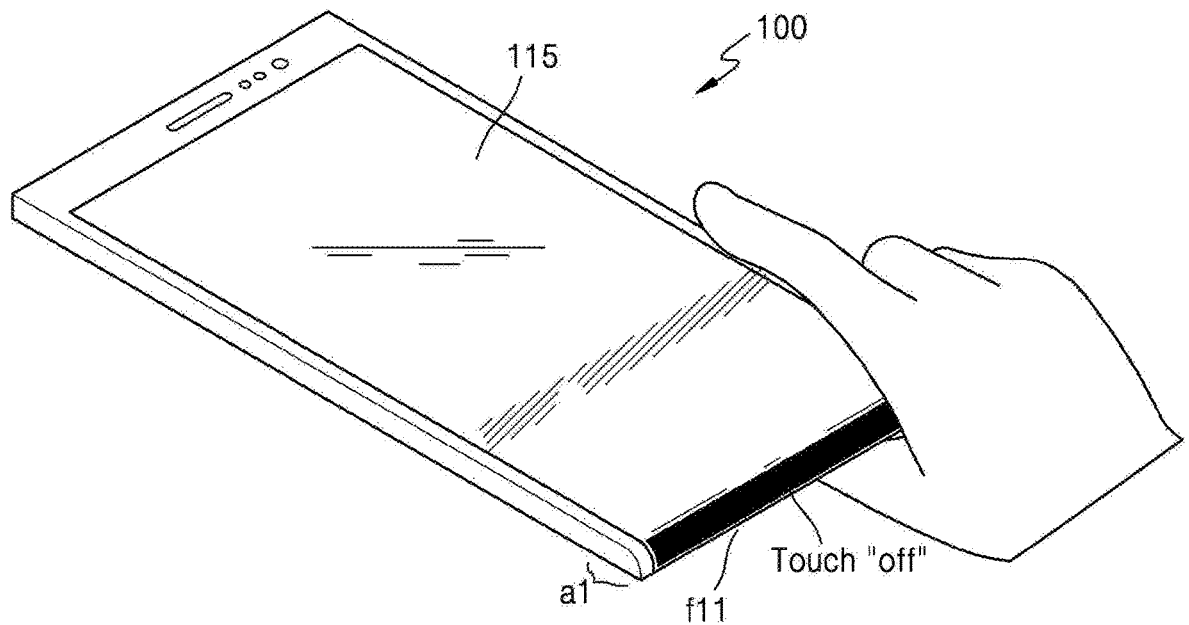
FIGS. 19A, 19B, and 20 illustrate diagrams for explaining an example of touch recognition in an edge display area, according to an exemplary embodiment.
Figure 19B:
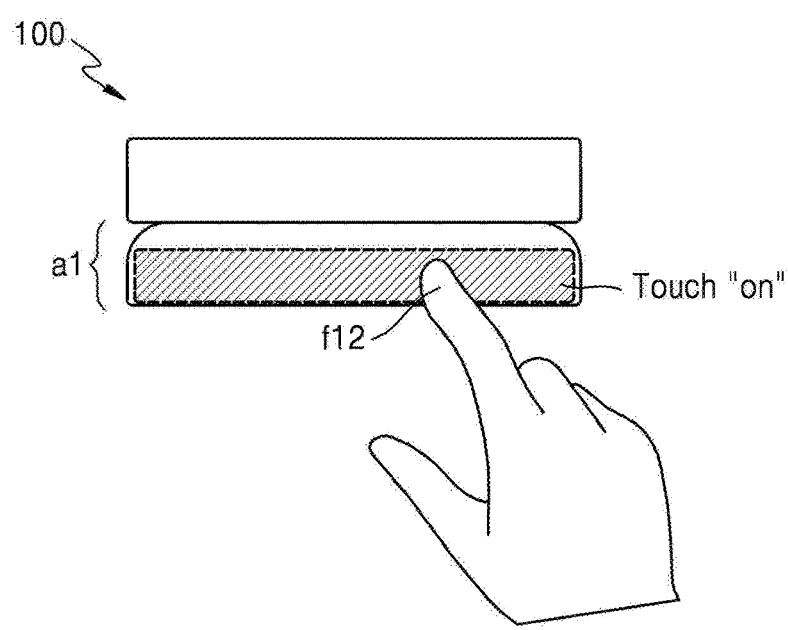
Figure 20:
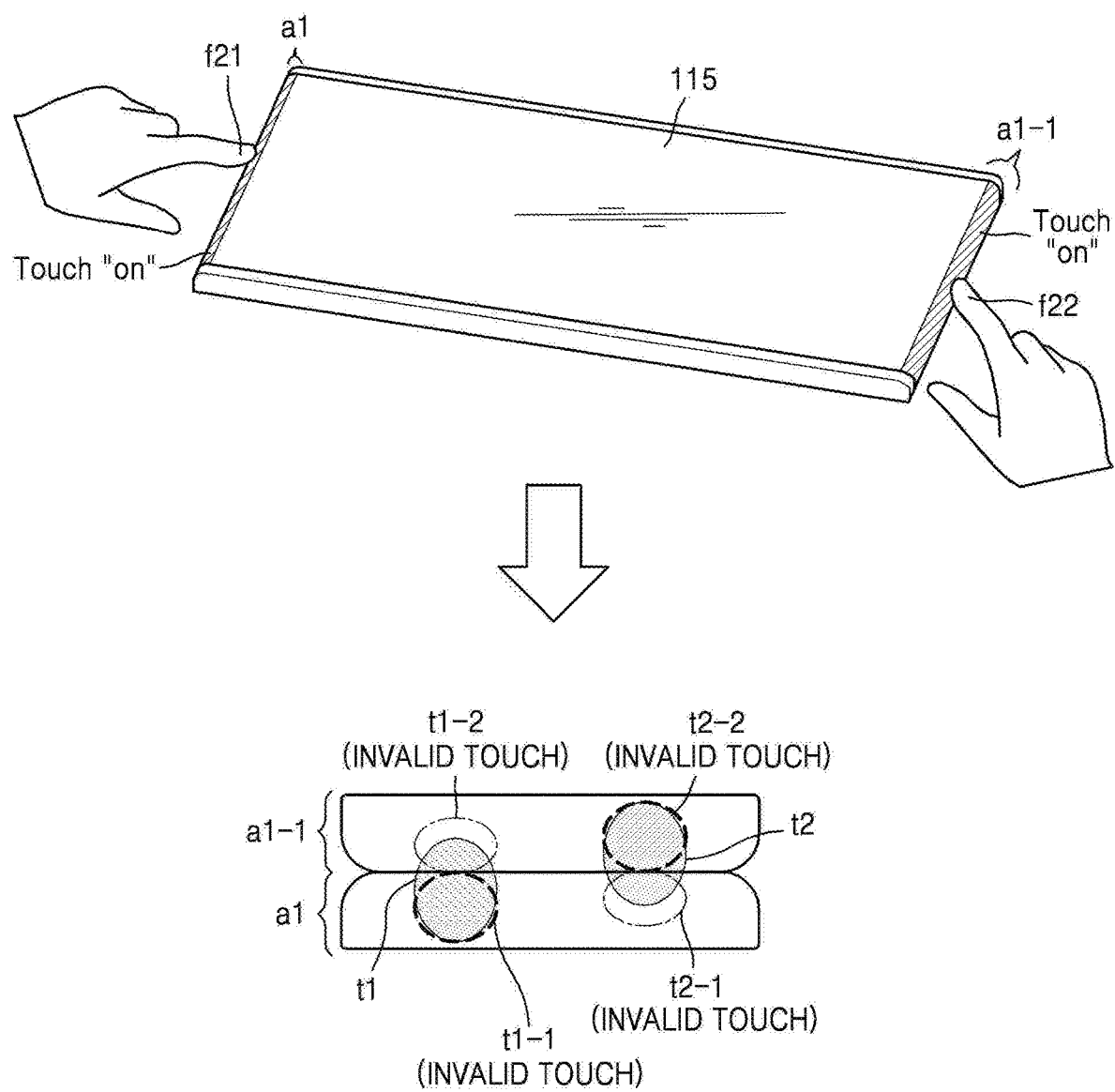

FIGS. 19A, 19B, and 20 illustrate diagrams for explaining an example of touch recognition in an edge display area, according to an exemplary embodiment.

As shown in FIG. 19A, when the foldable device 100 is in a state of being unfolded, the controller 180 may turn off a touch recognition function with respect to the edge display area a1. This is to prevent a malfunction of the foldable device 100 such that, when a user is holding the foldable device 100, a finger f11 of the user is misunderstood as a touch input to the edge display area a1 regardless of an intention of the user.

As shown in FIG. 19B, if the foldable device 100 is folded from a state of being unfolded, the controller 180 may turn on the touch recognition function with respect to the edge display area a1. This is to receive an input signal for operating a certain function of the foldable device 100, by receiving a user input of touching the edge display area a1 by using a finger f12 of a user.

FIG. 20 illustrates a diagram for explaining an example of controlling touch recognition when a plurality of edge display areas a1 and a1-1 are present.

As shown in the top portion of FIG. 20, when the foldable device 100 is in a state of being unfolded, the controller 180 may turn on a touch recognition function with respect to the edge display areas a1 and a1-1. In particular, the device 100 may receive an input signal for operating a function of the foldable device 100, by receiving a user input of touching the edge display areas a1 and a1-1 by using fingers f21 and f22 of a user.

As shown in the bottom portion of FIG. 20, if the foldable device 100 is folded from a state of being unfolded, the controller 180 may perform a calibration process so as to increase an accuracy of touch recognition with respect to the plurality of edge display areas a1 and a1-1. For example, the controller 180 may recognize only a touch input with respect to a relatively larger touched area from among touch inputs with respect to the plurality of edge display areas a1 and a1-1 as being a valid touch input.

Referring to the bottom portion of FIG. 20, in the case of a first touch input t1, since a touched part t-1 of the first edge display area a1 is larger than a touched part t1-2 of the second edge display area a1-1, the controller 180 may determine that a touch input to the first edge display area a1 is received.

Additionally, in the case of a second touch input t2, since a touched part t2-2 of the second edge display area a1-1 is larger than a touched part t2-1 of the first edge display area a1, the controller 180 may determine that a touch input to the second edge display area a1-1 is received.

Figure 21:
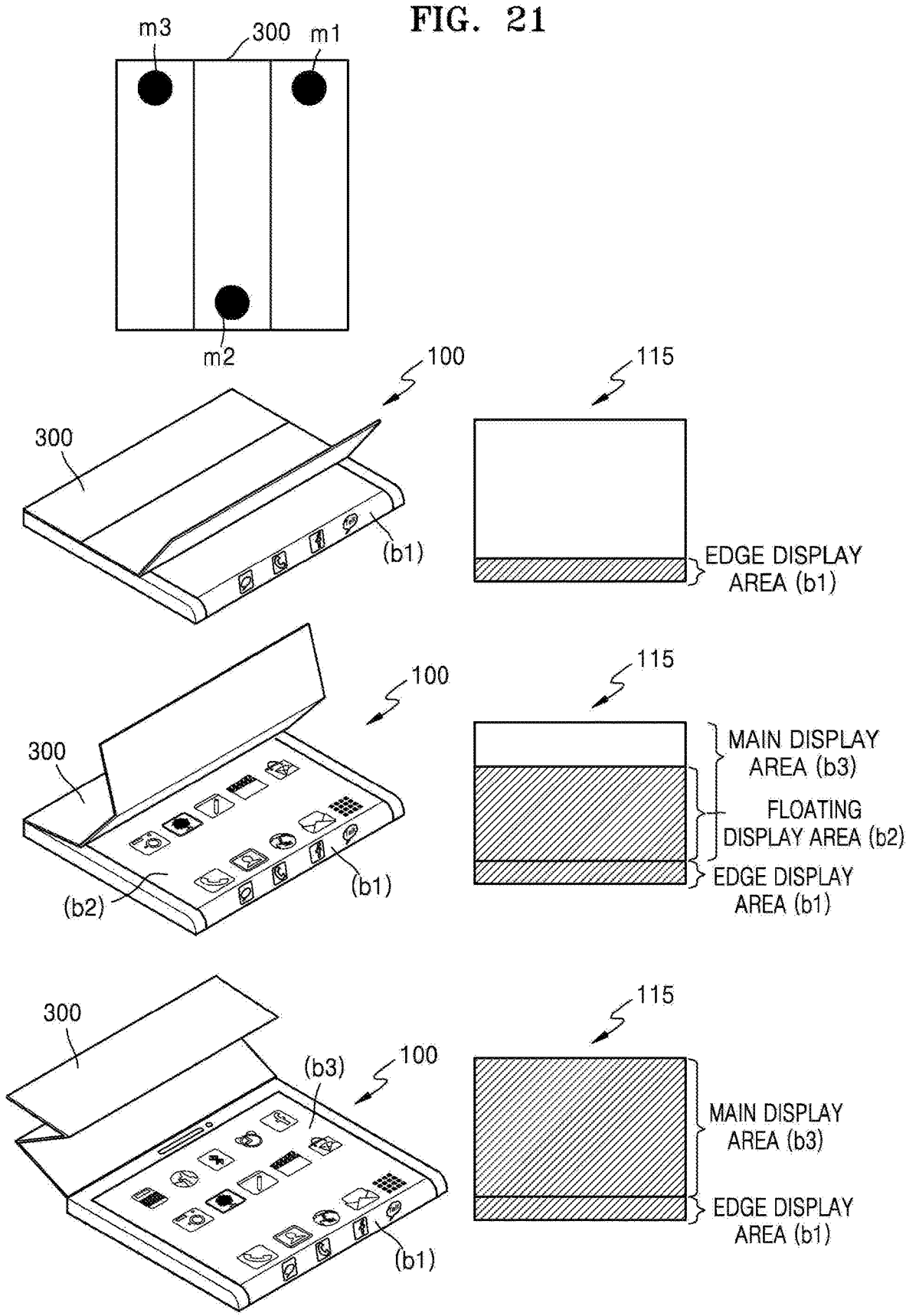
FIG. 21 illustrates a diagram for explaining an example of a device that is equipped with a foldable cover, according to an exemplary embodiment.

FIG. 21 illustrates a diagram for explaining an example of the foldable device 100 in which a foldable cover 300 is equipped, according to an exemplary embodiment.

As shown in FIG. 21, a foldable cover 300 for covering the flexible display unit 115 may be equipped in the foldable device 100. A plurality of magnets m1, m2, and m3 may be attached to an area in which the foldable cover 300 contacts the flexible display unit 115 when the foldable cover 300 covers the flexible display unit 115. The foldable device 100 may determine an area of the flexible display unit 115 which is covered by the foldable cover 300, by sensing a location and a number of magnets that contact the flexible display unit 115.

As shown in a top portion of FIG. 21, as the foldable cover 300 is opened from a state of being closed, the foldable device 100 may activate an edge display area b1 of the flexible display unit 115.

Additionally, referring to a center portion of FIG. 21, as the foldable cover 300 is opened in correspondence with a predetermined area, the foldable device 100 may activate the floating display area b2 of the flexible display unit 115.

Additionally, as shown in a bottom portion of FIG. 21, as the foldable cover 300 is opened at maximum, the foldable device 100 may activate a whole area of the main display area b3 that includes the floating display area b2 of the flexible display unit 115.

Figure 22A:
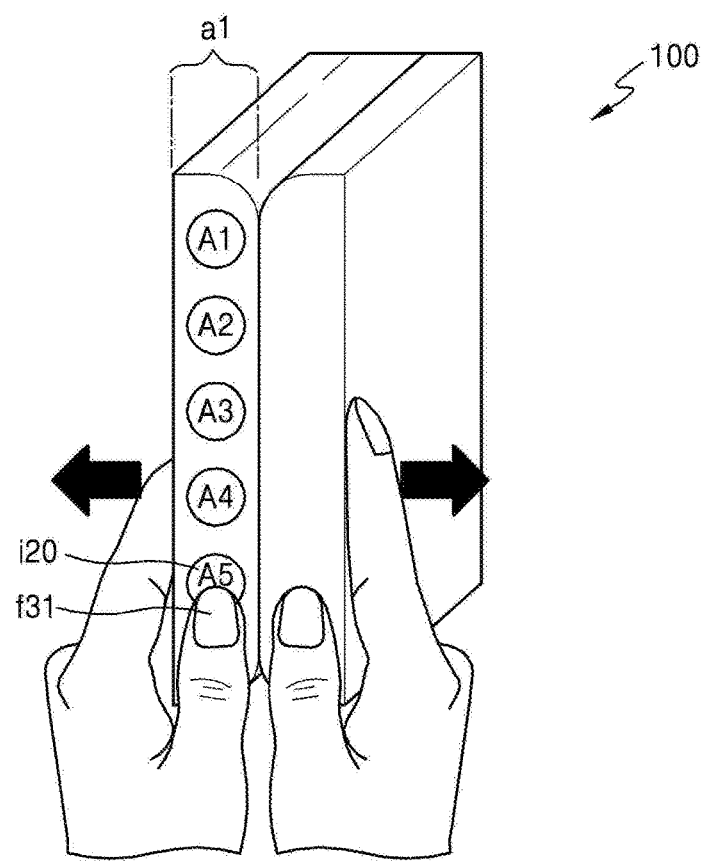
Figure 22B:
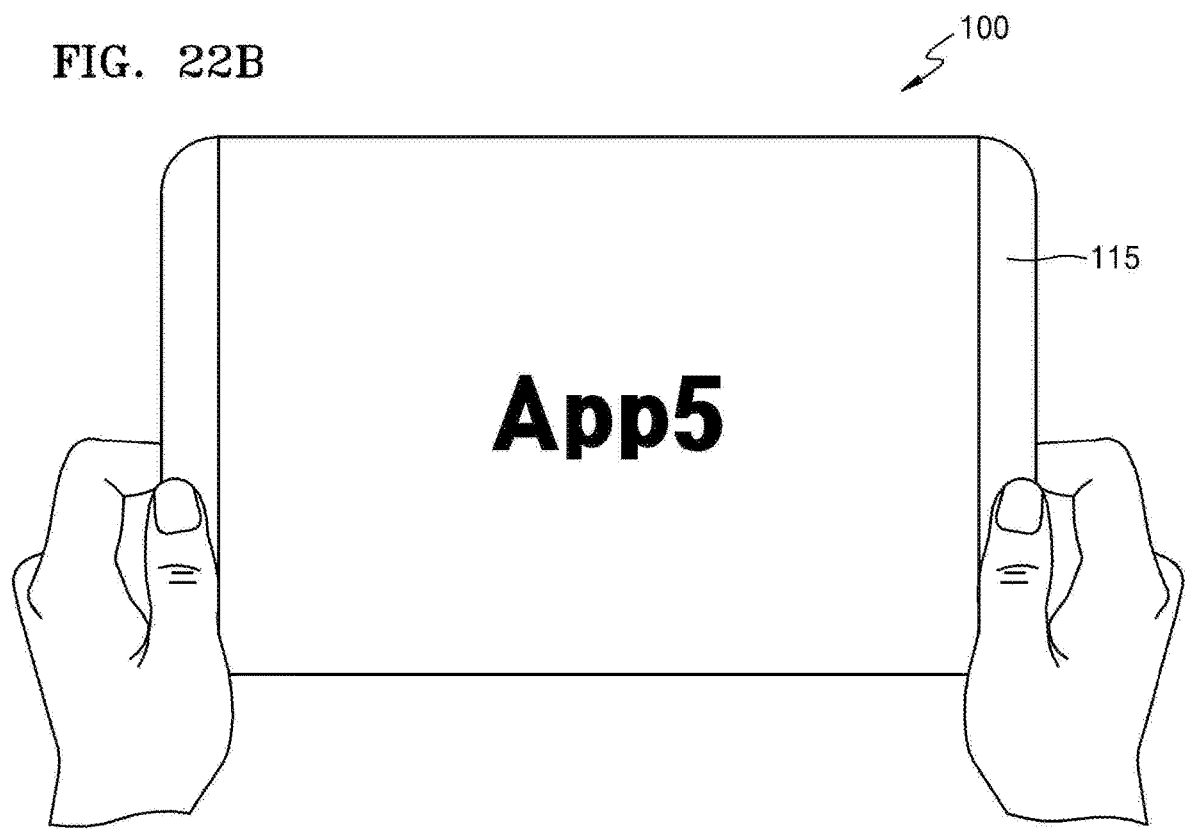

FIGS. 22A, 22B, and 23 illustrate diagrams for explaining an example of performing displaying on the flexible display unit 115, based on a gesture that relates to unfolding the foldable device 100.

As shown in FIG. 22A, a user may unfold the foldable device 100 while the user touches an icon i20, from among icons displayed on the edge display area a1, by using a finger or thumb f31. In this case, as shown in FIG. 22B, an execution screen that relates to an application which corresponds to the icon i20 touched by the user may be displayed on the flexible display unit 115.

FIG. 23 illustrates examples of executing different modes from each other based on a touch gesture performed when the foldable device 100 is unfolded.

As shown in a leftmost portion of FIG. 23, when the foldable device 100 is in a state of being folded, if a user holds both edge display areas a1 and a1-1 and unfolds the foldable device 100 by using both hands of the user while performing a gesture input in a direction d1 with a left hand and not performing a gesture input in a direction d2 with a right hand, a wallpaper in a general mode may be displayed on the flexible display unit 115.

Additionally, as shown in a center portion of FIG. 23, when the foldable device 100 is in a state of being folded, if a user holds both edge display areas a1 and a1-1 and unfolds the foldable device 100 while performing a gesture input in directions d3 and d4, a wallpaper in a children's mode may be displayed on the flexible display unit 115.

Additionally, as shown in a rightmost portion of FIG. 23, when the foldable device 100 is in a state of being folded, if a user holds both edge display areas a1 and a1-1 and unfolds the foldable device 100 while performing a gesture input in directions d5 and d6, a wallpaper in a business mode may be displayed on the flexible display unit 115.

Figure 24A:
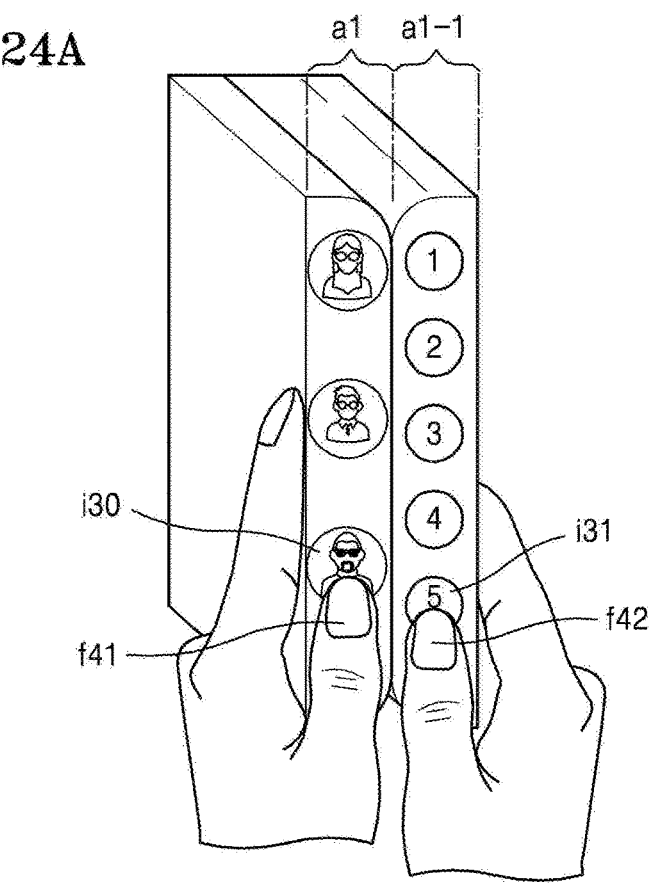
FIGS. 24A, 24B, and 25 illustrate diagrams for explaining an example of unlocking the display unit based on a gesture of unfolding the foldable device.
Figure 24B:
Figure 25:
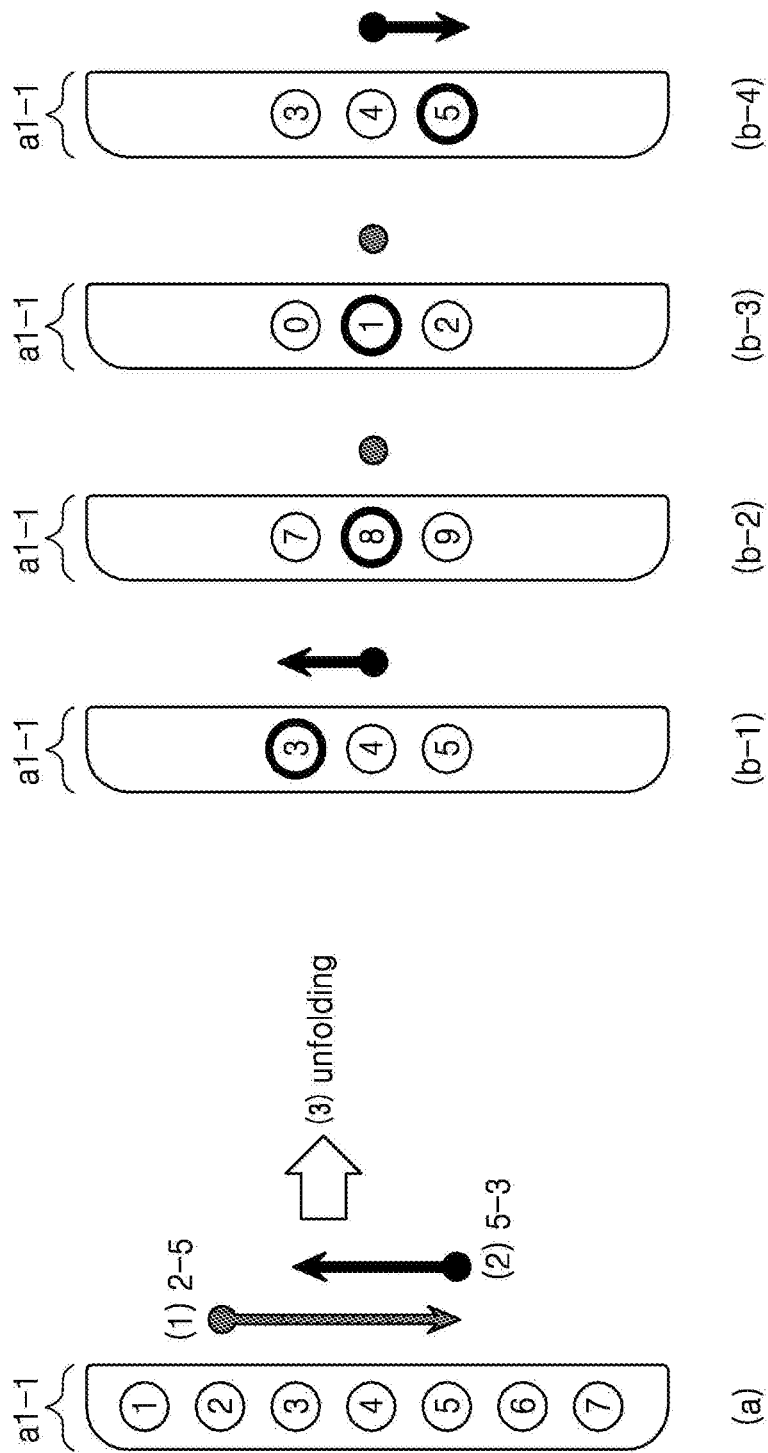

FIGS. 24A, 24B, and 25 illustrate diagrams for explaining an example of unlocking the flexible display unit 115 based on a gesture that relates to unfolding the foldable device 100.

As shown in FIG. 24A, user icons which respectively correspond to a plurality of users may be displayed on the first edge display area a1. Number icons for inputting a password may be displayed on the second edge display area a2.

For example, a user may unfold the foldable device 100 while touching a user icon i30 and a number icon i31 respectively by using fingers f41 and f42. If the foldable device 100 determines that the user icon i30 and the number icon i31 which are selected by a touch input correspond to each other, the foldable device 100 may release a locked state of the foldable device 100 and display a wallpaper on the flexible display unit 115, as illustrated in FIG. 24B.

FIG. 25 illustrates diagrams for explaining an example of inputting a password.

As shown in leftmost drawing (a) of FIG. 25, if a predetermined password for releasing a locked state of the foldable device 100 is 2-5-3, when a touch gesture of moving a finger in a direction from a number icon 2 to a number icon 5 which are displayed the edge display area a1-1, and then, a touch gesture of moving the finger in a direction from the number icon 5 to a number icon 3 displayed on the edge display area a1-1 are performed, the foldable device 100 is unfolded, and thus, the locked state of the foldable device 100 may be released.

Additionally, as shown in drawings (b-1), (b-2), (b-3), and (b-4) of FIG. 25, the foldable device 100 may sequentially provide expected number icons to the edge display area a1-1 so that an input of a password for releasing a lock state of the foldable device 100 is facilitated.

For example, drawings (b-1), (b-2), (b-3), and (b-4) of FIG. 25 illustrate a method for inputting a password when a predetermined password for releasing a locked state of the foldable device 100 is 3-8-1-5.

As shown in drawing (b-1) of FIG. 25, number icons 3, 4, and 5 may be sequentially displayed on the edge display area a1-1. If the foldable device 100 receives a touch gesture input of moving a user's finger in an upward direction so as to select the number 3, the foldable device 100 may provide number icons 7, 8, and 9 so that a next number in the password is input (as shown in drawing (b-2) of FIG. 25).

Then, the foldable device 100 may receive a tap input of selecting a number icon 8. Additionally, as illustrated in drawing (b-3) of FIG. 25, the foldable device 100 may receive a tap input of selecting a number icon 1. Then, as illustrated in drawing (b-4) of FIG. 25, the foldable device 100 may receive a touch gesture input of moving a finger in a downward direction so as to select the number icon 5. In this aspect, if the number icons 3-8-1-5 in the predetermined password are sequentially input, the locked state of the foldable device 100 may be released.

It may be understood that the exemplary embodiments described herein should be considered in a descriptive sense only and not for purposes of limitation. Additionally, the exemplary embodiments are not limited to sequences of operations provided in the flowcharts described with reference to FIGS. 4, 5, 14, and 16. It will be further understood that some operations may not be included, and additional operations may be further included, according to exemplary embodiments.

One or more exemplary embodiments can be embodied in the form of a recording medium containing commands which are implementable by a computer, such as, for example, a program module executed by a computer. The computer-readable medium may be any available medium accessible by a computer and includes any of volatile and non-volatile mediums and separable and non-separable mediums. Furthermore, the computer readable medium may include all of computer storage mediums and communication mediums. The computer storage medium includes any of a volatile and a non-volatile medium and a separable and a non-separable medium embodied by any method or technology for storing information such as a computer-readable command, a data structure, a program module or other data. The communication medium includes any of a computer readable command, a data structure, a program module or other data of a modulated data signal, or other transmission mechanisms, and includes any information transmission medium.

Additionally, a "unit" described herein may include a hardware component, such as a processor or a circuit, and/or a software component executed by a hardware component such as a processor.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. For example, each component described in a singular form may be executed in a distributed form. Likewise, components described in a distributed form may be executed in a combined form.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. A foldable device comprising:
   a flexible display comprising a display area;
   a sensing unit configured to sense an angle at which the foldable device is unfolded; and
   a controller configured to:
      based on detecting an unfolding of the foldable device, control the flexible display to display a first content in a partial area of the display area based on the angle at which the foldable device is unfolded, and
      in response to the angle at which the foldable device is unfolded being increased, expand the partial area of the display area to display a second content,
   wherein the controller is further configured to adjust at least one of a type and an amount of the second content to be displayed on the expanded partial area of the display area in accordance with an increase in the angle at which the foldable device is unfolded.

2. The foldable device of claim 1, wherein the controller is further configured to, based on detecting an unfolding of the foldable device, determine a range of the expanded partial area of the display area on which the second content is displayed.

3. The foldable device of claim 1, wherein the controller is further configured to adjust an attribute of the second content that is to be displayed on the expanded partial area of the display area.

4. The foldable device of claim 1, wherein the flexible display further comprises edge display areas, and
   wherein the controller is further configured to display first third content on the edge display areas and to display detailed content, the detailed content being related to the first third content, on an activated portion of the display area.

5. The foldable device of claim 1, wherein the controller is further configured to determine a location from which a portion of the display area on which the content starts to be displayed, based on a direction in which a user views the foldable device.

6. The foldable device of claim 1, wherein the flexible display further comprises a plurality of edge display areas, and
   the controller is further configured to determine at least one edge display area on which the content starts to be displayed from among the plurality of edge display areas, based on an angle at which the foldable device is inclined while in a state of being folded and a direction in which a user views the foldable device.

7. The foldable device of claim 1, wherein the flexible display further comprises edge display areas, and
   wherein the controller is further configured to display content with respect to an event on the edge display areas in response to the event, the event comprising at least one of a message reception, a call reception, and an alarm being generated.

8. A method for controlling a foldable device that comprises a flexible display comprising a display area, the method comprising:
   based on detecting an unfolding of the foldable device, controlling the flexible display to display a first content in a partial area of the display area based on an angle at which the foldable device is unfolded;
   in response to the angle at which the foldable device is unfolded being increased, expanding the partial area of the display area to display a second content; and
   adjusting at least one of a type and an amount of the second content that is to be displayed on the expanded partial area of the display area in accordance with an increase in the angle at which the foldable device is unfolded.

9. The method of claim 8, further comprising, based on detecting an unfolding of the foldable device, determining a range of the expanded partial area of the display area on which the second content is displayed.

10. The method of claim 9, further comprising adjusting an attribute of the second content that is to be displayed on the expanded partial area of the display area.

11. The method of claim 8, wherein the flexible display further comprises edge display areas, and
    further comprising displaying third content on the edge display areas and to display detailed content, the detailed content being related to the third content, on an activated portion of the display area.

12. The method of claim 8, further comprising determining a location from which a portion of the display area on which the content starts to be displayed, based on a direction in which a user views the foldable device.

13. The method of claim 8, wherein the flexible display further comprises a plurality of edge display areas, and
    further comprising determining at least one edge display area on which the content starts to be displayed from among the plurality of edge display areas, based on an angle at which the foldable device is inclined while in a state of being folded and a direction in which a user views the foldable device.

14. The method of claim 8, wherein the flexible display further comprises edge display areas, and
    further comprising displaying content with respect to an event on the edge display areas in response to the event, the event comprising at least one of a message reception, a call reception, and an alarm being generated.

15. A non-transitory computer-readable recording medium having recorded thereon a program, wherein the program, when executed by a processor of a computer, causes the computer to execute the method of claim 8.

* * * * *